Nov. 10, 1953

H. J. DUKE 2,658,669

AUTOMATIC BALANCE SCHEDULING MEANS
FOR LISTING CALCULATING MACHINES

Filed Jan. 14, 1953

INVENTOR
HARVIE J. DUKE
BY
Elmer W. Edwards
AGENT

Nov. 10, 1953 H. J. DUKE 2,658,669
AUTOMATIC BALANCE SCHEDULING MEANS
FOR LISTING CALCULATING MACHINES
Filed Jan. 14, 1953 12 Sheets-Sheet 4

INVENTOR
HARVIE J. DUKE
BY
Elmer W. Edwards
AGENT

FIG. 6
FIG. 7
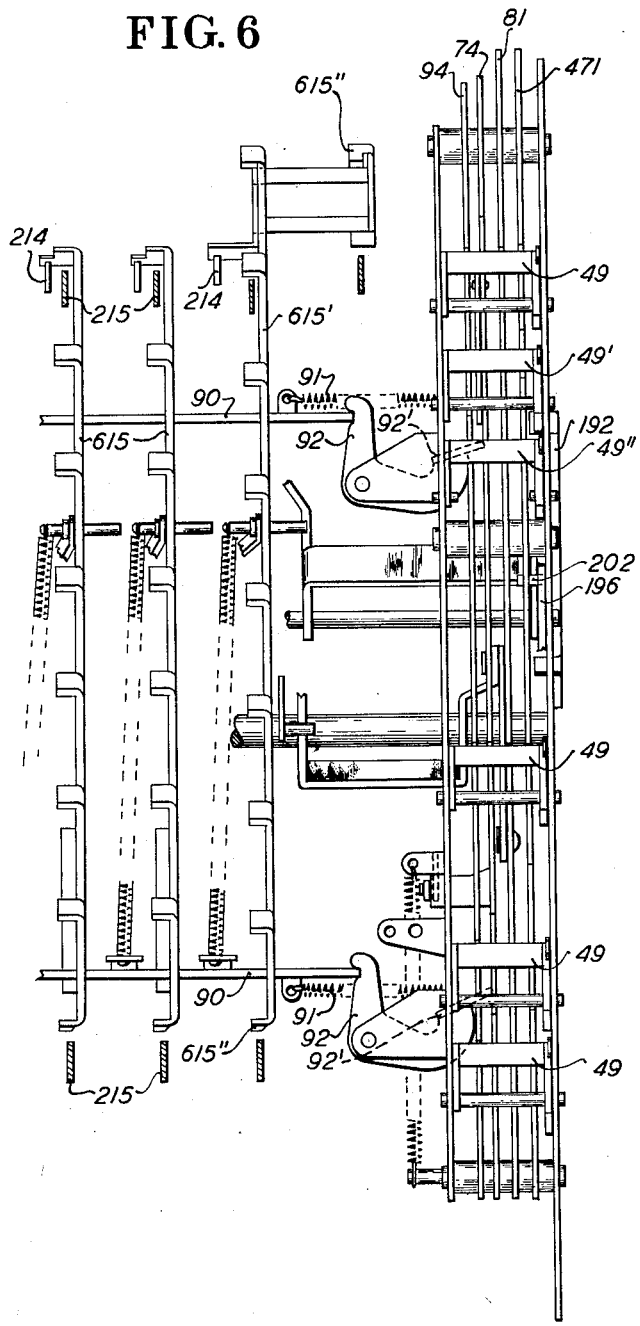
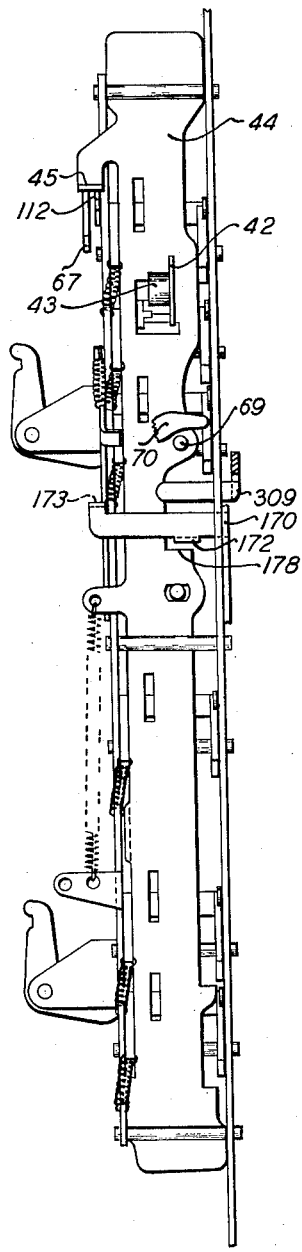
INVENTOR
HARVIE J. DUKE
BY
AGENT

Nov. 10, 1953  H. J. DUKE  2,658,669
AUTOMATIC BALANCE SCHEDULING MEANS
FOR LISTING CALCULATING MACHINES
Filed Jan. 14, 1953  12 Sheets-Sheet 7

INVENTOR
HARVIE J. DUKE
BY Elmer W. Edwards
AGENT

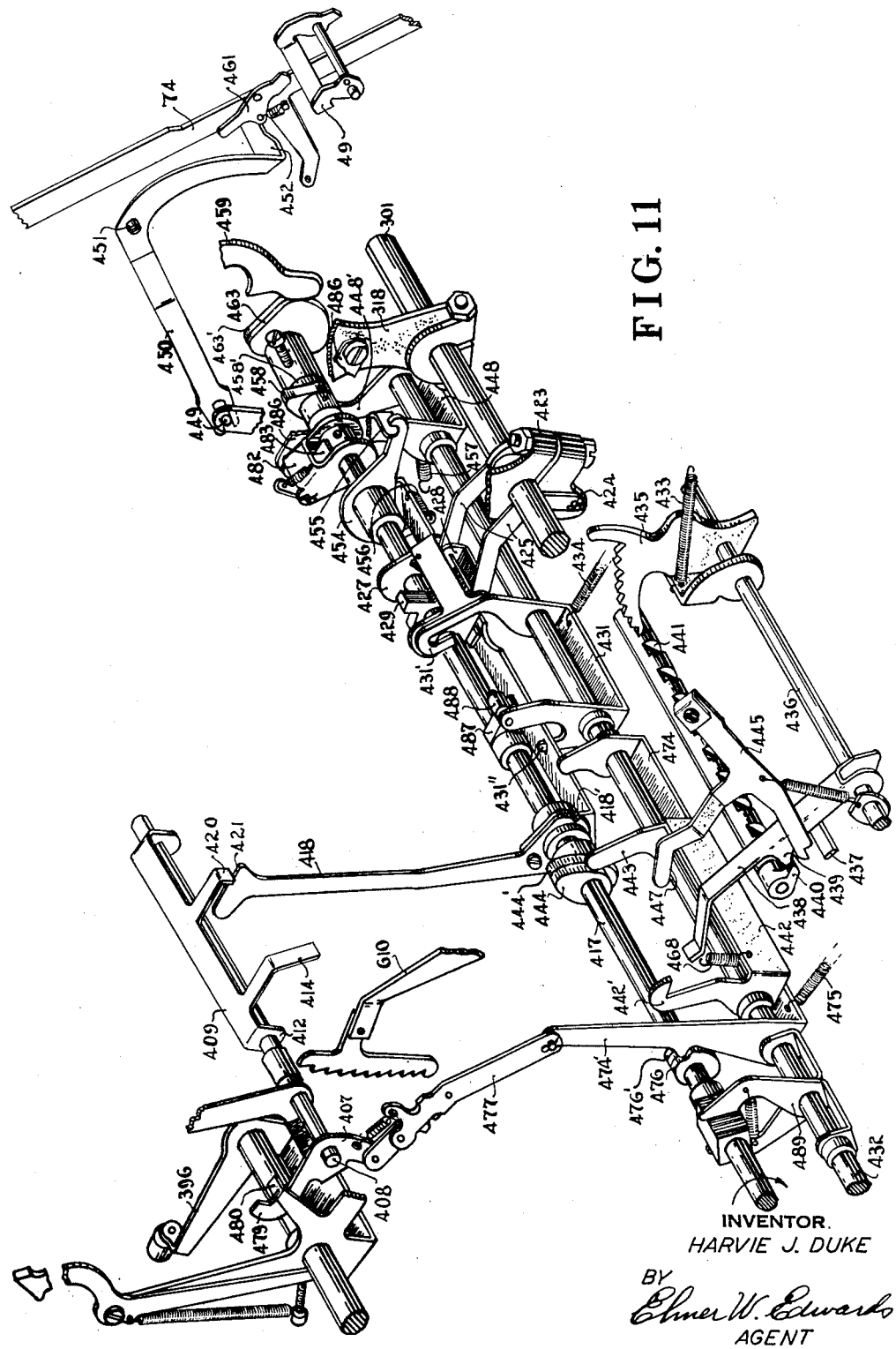

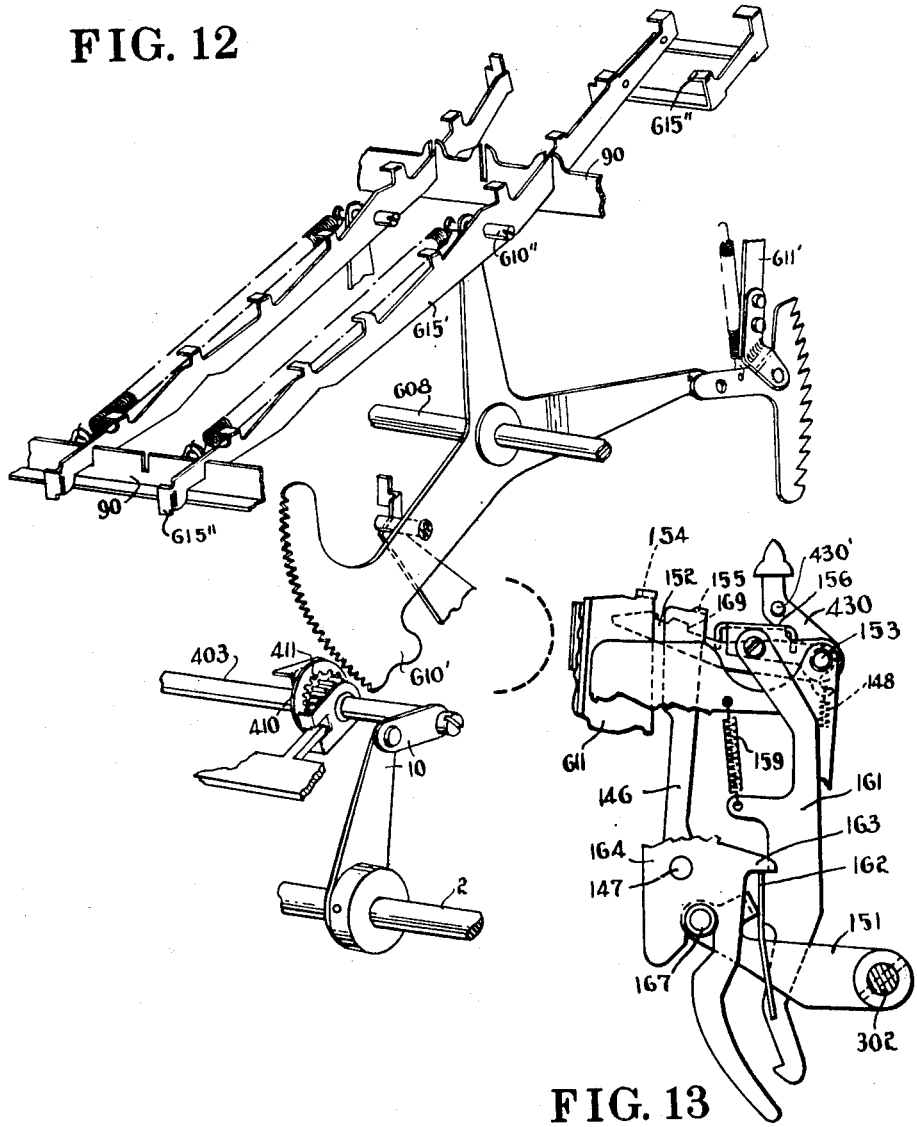

Nov. 10, 1953 — H. J. DUKE — 2,658,669
AUTOMATIC BALANCE SCHEDULING MEANS FOR LISTING CALCULATING MACHINES
Filed Jan. 14, 1953

Inventor
HARVIE J. DUKE
BY
Elmer W. Edwards
AGENT

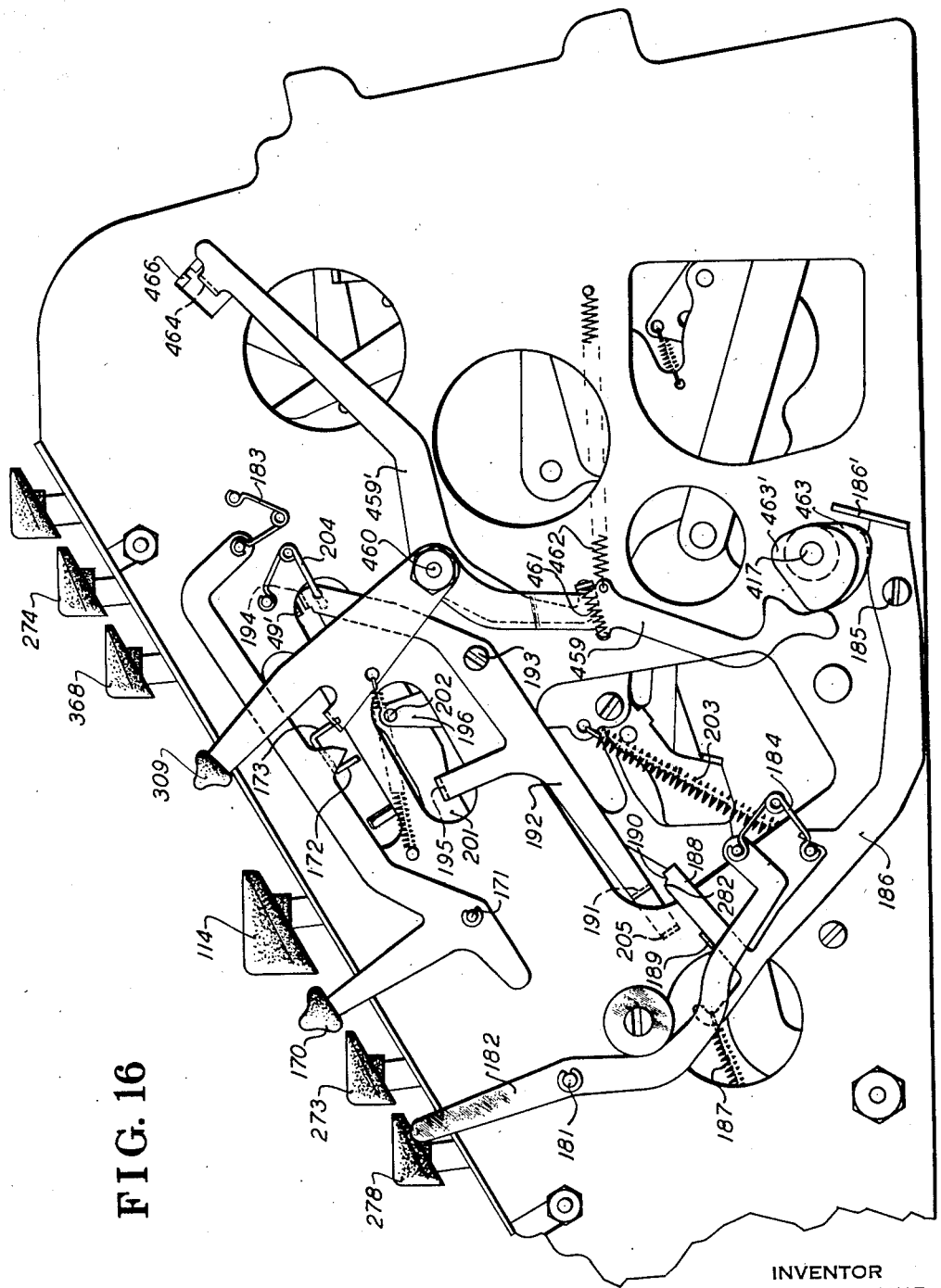

Nov. 10, 1953    H. J. DUKE    2,658,669
AUTOMATIC BALANCE SCHEDULING MEANS
FOR LISTING CALCULATING MACHINES
Filed Jan. 14, 1953    12 Sheets-Sheet 12

INVENTOR
HARVIE J. DUKE
BY
Elmer W. Edwards
AGENT

Patented Nov. 10, 1953

2,658,669

UNITED STATES PATENT OFFICE 2,658,669

AUTOMATIC BALANCE SCHEDULING MEANS FOR LISTING CALCULATING MACHINES

Harvie J. Duke, Butler, N. J., assignor to Monroe Calculating Machine Company, Orange, N. J., a corporation of Delaware Application January 14, 1953, Serial No. 331,220

23 Claims. (Cl. 235—60.31)

The invention relates to improvements in listing calculating machines and more particularly to means for automatically controlling a program of operations for scheduling the unpaid balances of time payment accounts.

The devices herein disclosed constitute improvements in the devices set forth in U. S. copending application Serial No. 235,453 filed July 6, 1951 by Howard M. Fleming entitled "Balance Scheduling Means for Listing Calculating Machines," said application and the present application being both assigned to the Monroe Calculating Machine Company of Orange, New Jersey. Reference is also made to U. S. copending application Serial No. 229,581 filed June 2, 1951 by Howard M. Fleming entitled "Adding Listing Machine" and assigned to said Monroe Calculating Machine Company.

The Fleming application #235,453 sets forth a means whereby repeated manual operations of a special operations control key (BAL KEY) in combination with repeated alternate manual operations therewith of the plus or the minus operations control keys provides for an accumulative or a reducing balance scheduling, including in either case progressive listing of the month dates in which payments fall due.

The present invention contemplates the provision of means to not only provide for such manual operations control but to also accomplish such scheduling operations automatically, thereby avoiding the repeated manual operations of the control keys.

As a further object, means are provided to automatically terminate the operations when a reducing balance schedule indicates a final payment has been made.

Means are also provided whereby at the completion of a scheduling operation both the keyboard and register means will automatically be in cleared condition ready for a new account.

A further object is the provision of means whereby an operator may terminate or interrupt the automatic scheduling operation and operate manually at will and thereafter restart the automatic operations, all while the keyboard value remains as set.

With the foregoing and incidental features in view, the invention includes the novel features of construction and combination of parts, the essential elements of which are set forth in the appended claims and a preferred embodiment of which is hereinafter described with reference to the drawings which accompany and form a part of this specification.

In the drawings:

Fig. 3A is an enlarged detail view of means for controlling the register operations control slide, showing certain parts in a partially operated position;

Fig. 6 is a detail plan view of the operation control slides and associated parts;

Fig. 7 is a detail plan view of the clutch release slide;

Fig. 11 is a left-hand perspective showing the means for converting a complemental total registration to a true negative total registration;

Fig. 12 is a right-hand perspective of the parts associated with the month date control wheel;

Fig. 13 is a detail left side elevation of parts associated with control of the printing means;

Fig. 16 is a right side elevation showing control means for automatic balance scheduling operations;

Figure 1:
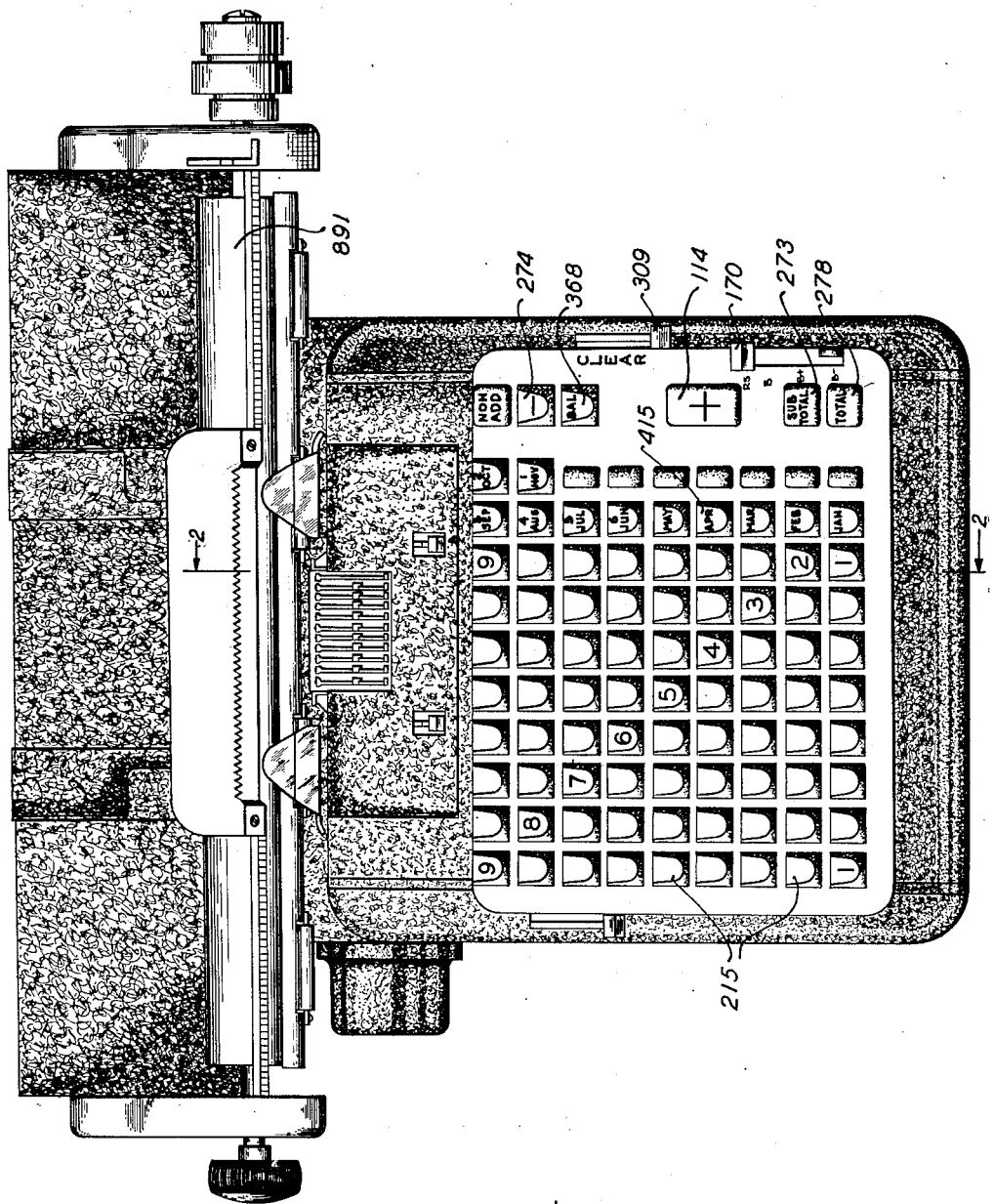
Fig. 1 is a diagrammatic plan view of a machine embodying the invention.

The invention is herein shown as applied to a listing adding machine of well-known type, such as that disclosed in its essential features in U. S. Patent No. 1,932,013 issued October 24, 1933 to Loring P. Crosman, and as modified by the disclosures of U. S. Patents 2,307,669 and 2,330,270 issued to the same inventor on January 5, 1943 and September 28, 1943.

For further details of construction not completely described herein, reference is also made in the specification to:

(a) U. S. Patent 2,055,623—October 29, 1936, L. P. Crosman—Calculating Machine
(b) U. S. Patent 1,828,180—October 20, 1931, Clyde Gardner—Calculating Machine
(c) U. S. Patent 1,915,296—June 27, 1933, L. P. Crosman—Register
(d) U. S. Patent 2,261,341—November 4, 1941, L. P. Crosman—Adding and Listing Machine
(e) U. S. Patent 2,050,302—August 11, 1936, H. M. Fleming—Listing, Adding and Subtracting Machine

General operation (addition)

As more fully set forth in the reference patents, amounts set up on digit keys 215 (Figs. 1 and 2) for each denominational order are transferred additively or subtractively upon operation of plus key 114, or minus operating key 274, to an accumulator or register comprising a series of accumulator or register wheels 473 by means of a series of spring operated differential actuators 610 loosely mounted upon a transverse shaft 698. The forward arm of each differential actuator lever 610 is provided with segmental rack teeth, adapted to mesh with the pinions 472 of the series of accumulator wheels 473. Index bars 615 are pivotally connected to the upper arms of levers 610, these index bars being moved, upon counterclockwise rotation of the levers, into engagement with the stems of selectively depressed keys 215. The type bars 611 are pivotally connected to the rearward arms of levers 610, each type bar being provided with a longitudinally disposed series of type representing the digits 0 and 1 to 9.

The digit keys 215 which have been depressed to represent a value are latched in position with the bottoms of their stems lying in the path of movement of the stop lugs of the related bars 615, allowing such bars to advance a distance proportional to the value of the key, upon operation of the machine. Depression of a digit key will also remove a column latch 214 from the path of movement of its related stop bar 615, these latches preventing movement of a stop bar and lever 610 in any column in which no key is depressed.

Figure 2:
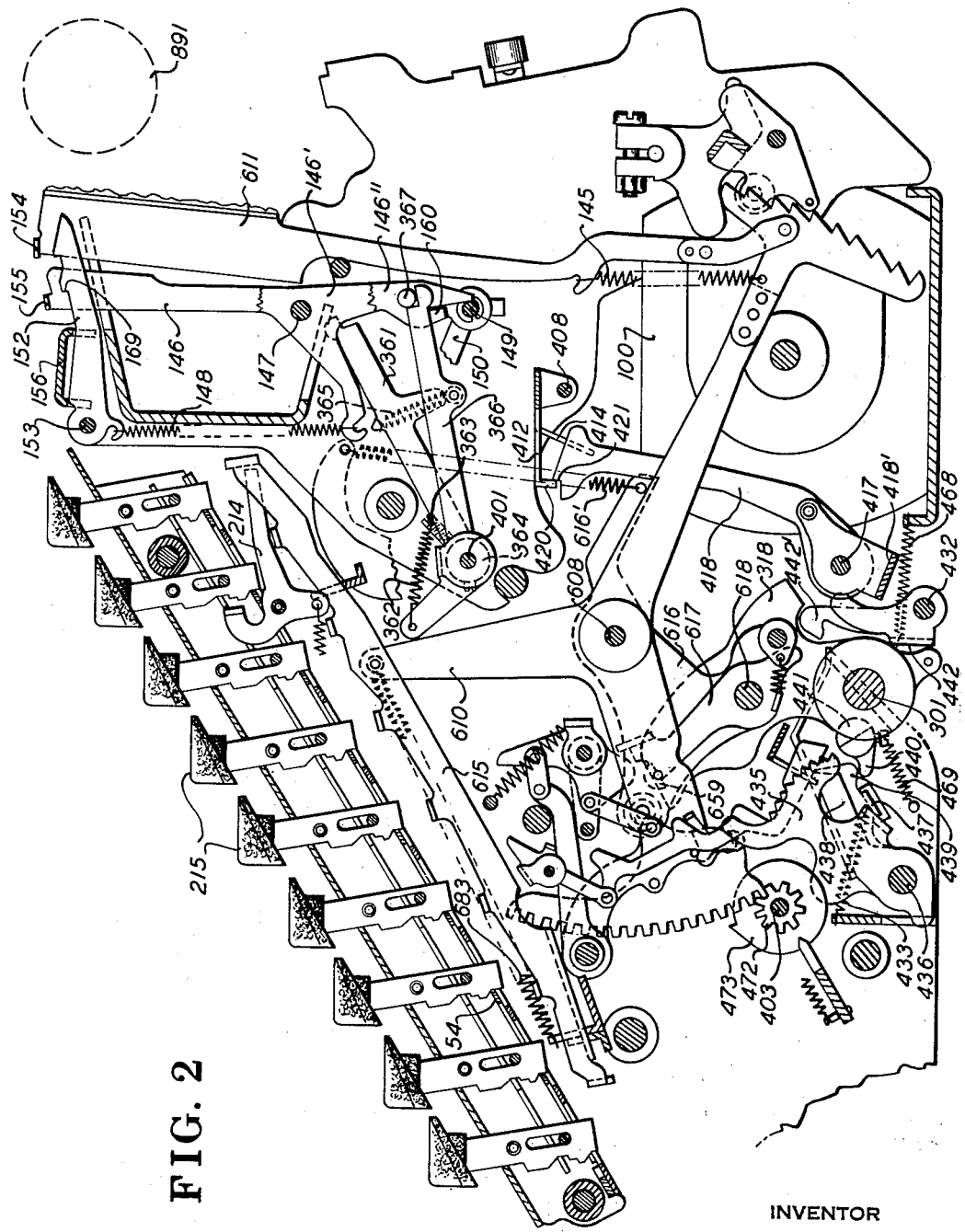
Fig. 2 is a section taken substantially on line 2—2 of Fig. 1 showing the keyboard, registering and printing devices.
Figure 5:
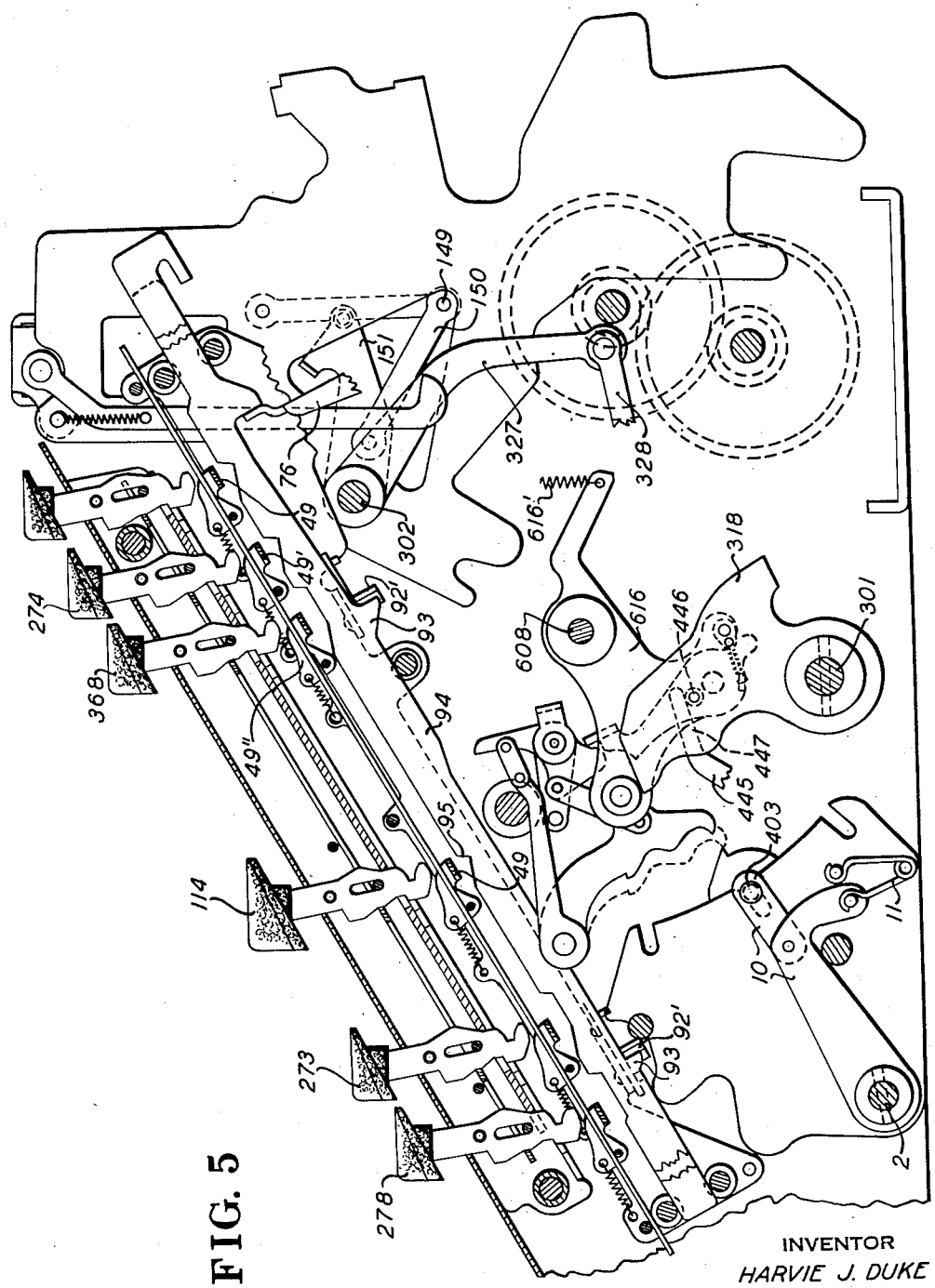
Fig. 5 is a right side elevation showing means for engaging and disengaging the accumulators with the actuator segments.

Each of the racks 610 is held in its normal clockwise position against tension of its respective spring 683, by a stud 659 fast in said racks and having engagement with a series of dogs 617 pivotally mounted upon a transverse rod 618 supported within a rocker frame 616 loosely mounted on the shaft 698 (Figs. 2 and 5).

A rock shaft 301 (Fig. 3) is oscillated by means of an electric motor 100 (Fig. 2) connected through suitable gearing and clutch means 103—104 (Fig. 3) with a rock arm 316, fast with shaft 301 by means of a connecting rod 108 so that, as a crank arm 105 is rotated by the motor, shaft 301 will be oscillated.

Rock shaft 301 is provided with cam means 318 (Figs. 2 and 5) for governing the movement of frame 616. As shaft 301 is rotated forwardly cam 318 will permit frame 616 under influence of spring 616' to be rocked counterclockwise and any of the levers 610 which have been released by the depression of digit keys 215 will be allowed to rotate under influence of their springs 683 until they are stopped by the lugs of bar 615 contacting with the stems of the depressed keys. Upon rearward return movement of shaft 301 the cam 318 will restore frame 616 and the dogs 617 will return the operated levers 610 to normal position. This excursion of the levers 610 serves to register amounts set in the keyboard upon one or more accumulators 473 and to set up a similar amount on the printing line of the type bars.

Release of clutch pawl 103 is effected upon depression of any of the motor keys, the stems of which are provided with a cam surface 40 (Figs. 3 and 4) acting upon depression of a key to move a slide 41 forwardly, thereby operating a bell crank lever 42, raising roller 43 of said lever out of engagement with a suitable opening in a spring operated slide 44 (see also Fig. 7). Slide 44 is provided with a lug 45, which upon depression of an operating key and subsequent forward operation of slide 44 engages the upper arm of a pivoted latch 112, thereby releasing said latch from clutch control lever 106, whereupon said lever will be moved counterclockwise by its spring 89 and an insulation roller 109 on said lever will act to close a switch 110 in the circuit of the electric motor. In this movement, the lower end of lever 106 will be disengaged from the tail of the spring urged clutch pawl 103 and allow said pawl to fall into engagement with the driving clutch member 104 to effect a machine cycle of operation.

During a cycle of operation the wheels of the accumulators 473, if engaged, are rotated subtractively upon the forward stroke or additively upon the return stroke of the actuators 610, there being an actuator lever 610 and an associated accumulator wheel for each order provided in the machine, the timed meshing and unmeshing of the accumulator gears being controlled as follows, and as more fully described in U. S. Patent 2,055,623 to which reference is made for more detailed description.

As shown (Fig. 2) the accumulator pinions 472 stand normally in mesh with the segment gears of actuators 610, the accumulator shaft 403 being mounted in guide slots (Fig. 5) of the machine frame so that the accumulator assembly may be moved radially of the actuators, to mesh and unmesh the pinions 472. Shaft 403 is adjusted by means of toggle linkage 10, one member of which is fast upon a rock shaft 2. The linkage is held in either of two adjusted positions by a toggle spring 11. Fast upon shaft 2 is a plate 419 (Fig. 3) having yieldable spring connection 4 with an arm 5 provided with a lateral flange 22. Pivoted at 33 upon said arm is a cam switch 6 which, with flange 22 of arm 5, lies in the plane of a roller 7 fixed upon rock arm 316.

In additive operations incident to depression of key 114 roller 7 will contact cam surface 21 of switch 6 and thereafter with the rear end of flange 22, whereby arm 5 will be raised, thus rocking shaft 2 and linkage 10, to unmesh the pinions 472 of the accumulator before the actuators are allowed to move. During the continued forward movement of actuators 610, arm 5 will be held in raised position by engagement of roller 7 with the lower surface of flange 22. At the end of the forward stroke, roller 7 will lift the forward end of switch 6 away from a lug 20 of arm 5, and will thereafter move out of contact with the switch, which then returns under influence of a spring 75 into normal relation with the arm. Upon the return stroke of the operating mechanism, roller 7 will engage a cam surface 23 of switch 6, restoring arm 5 and the parts 419, 10, and 403 to original position, remeshing the pinions 472 with the segments 610 to effect the registration.

*Subtract and non-add operations*

Subtract and non-add operations are performed in response to the depression of a subtract key 274 and a non-add key 275 respectively, these keys controlling the positioning of a slide 74 (Fig. 3), which in turn controls the adjustment of the switch 6. Slide 74 is held normally in rearward position against the tension of spring 75 by engagement of the upper end of a lever 76 with a shoulder of the slide, lever 76 being provided with an anti-friction roller normally engaging the high point of the cam portion of plate 105. In the operation of the machine lever 76 will be reciprocated, and slide 74 will be allowed to move forward under the influence of spring 75. In additive operations, however, this forward movement of slide 74 is prevented by engagement of a shoulder 77 of the slide with the bail 49 which has been displaced by the add key 114. There is no shoulder on slide 74 which may contact with the bail 49' of subtract key 274, so that when the subtract key is depressed and the machine operated, slide 74 will move to its extreme forward position. Depression of non-add key 275 will bring its bail 49 into the path of movement of a shoulder 78 of slide 74, to provide for partial forward movement of said slide. Thus slide 74 will be selectively positioned according to the key depressed, the three positions of the slide being transmitted to switch 6 by means of an arm 79, pivoted to the slide, and held in relation thereto by the spring 75, and a link 80 connecting arm 79 with an arm of the switch.

Depression of the subtract key will thus effect rocking of switch 6 clockwise about its pivot point 33, whereby cam surface 21 will lie out of the path of movement of roller 7. Therefore, upon the forward stroke of the operating mechanism roller 7 will move idly over flange 22, allowing the pinions 472 of the accumulator to remain in mesh with the segments during the subtractive stroke thereof. At the end of the forward stroke roller 7, having momentarily displaced and passed beyond the switch, will be positioned adjacent the surface 34 of the switch with which it will engage during the return stroke of the operating mechanism, to raise arm 5 and disengage the pinions from the segments before additive movement thereof. During this return movement roller 7 passes beneath flange 22, and near the end of the movement will engage a projection 35 of arm 5 to restore the parts to normal position.

All of the operation keys are identical in construction, and subtract key 274, aside from the adjustment of switch 6, will provide for the same functioning of the machine as in the case of add key 114.

Non-add key 275 will also provide for the same functioning of the machine except that switch 6 will be rocked only sufficiently to bring cam surface 21 parallel with the end of flange 22 of arm 5. This will bring the entire switch below the upper line of the flange, except for a projection of the forward end of the switch which will be above said line. This, however, does not result in any deflection of arm 5, since in the return stroke of the operating mechanism roller 7 will engage the cam surface 23 of the switch, momentarily rocking the same. Therefore, in non-add operations roller 7 will be reciprocated without effecting unmeshing of the pinions 472, and any amounts subtracted from the accumulator wheels by the actuators during the forward stroke of the operating means will be added back during the return stroke.

The forward movement of slide 44 to engage the clutch 103—104 also serves to lock any of the operating control keys in their depressed position, by engagement of said slide with a shoulder 46 of the key stems, thus holding the key in depressed position until restoration of slide 44, as hereinafter explained.

Near the end of the cycle of operation of the machine, after actuators 610 have been brought to rest, means will be operated to restore slide 44 to thereby release the operation key and any set digit keys and to disengage the clutch and restore the control elements to normal position. For this purpose an anti-friction roller 65' mounted on a lever 65 (Fig. 4) will be engaged by a cam projection of plate 105, and rocked clockwise against tension of a spring 66 secured at one end to lever 65 and at its other end to a fixed framing of the machine. A pivoted lever 67 has yieldable connection with lever 65 through means of a spring 68, lever 67 extending upwardly and into the path of movement of the lug 45 of slide 44. Displacement of lever 65 by the cam edge of plate 105 will therefore retract slide 44 to and rearwardly beyond its normal position of rest, thereby unlocking the operation keys and permitting roller 43 to again fall into latching engagement with said slide. The extra rearward movement of slide 44 is utilized to clear the digit keyboard by means of a pin 69 on said slide engaging a bell crank lever 70 to impart forward movement to the keyboard locking slides 54 (Fig. 2), as fully set forth in reference Patent No. 2,330,270.

If repeat operations are to be performed, the operator maintains finger pressure upon the add or subtract operating keys 114, 274 whereby roller 43 is held out of engaging position with slide 44, so that when, during the final portion of the cycle, the roller of lever 65 drops from the high point of the cam of plate 105, lever 67 will be moved forwardly and slide 44 released for forward movement, providing for a second cycle of operation of the machine. When an operating key is so held a portion 72 of the keystem (Fig. 3) lying opposite the locking shoulder 46 will prevent retraction of slide 44 rearward beyond normal position, this being permitted by the tensioning of spring 68 and providing for non-clearing of the digit keyboard.

A manually settable lever 170 (Figs. 7 and 16), pivoted to the framing at 171, has a projection 172 adapted in the rearward setting of said lever to be positioned in the path of movement of a shoulder 178 of slide 44 to also prevent rearward movement of said slide beyond normal position to prevent a clearing of the keyboard.

On the above described restoral of slide 44 the projection 45 will permit latch 112 to fall and rest upon the projection 106' of latch 166. Near the end of the clockwise movement of lever 65 a projection 65'' (Fig. 4) thereof engages and rocks lever 106 into the path of movement of clutch pawl 103 to disengage said pawl from driving member 104, whereupon latch 112 reengages projection 106' terminating the cycle of operation.

Each accumulator wheel unit is connected to the higher order accumulator wheels by well known tens transfer mechanism of the "crawl" carry type, such as described in U. S. Patent 1,828,180, issued to Clyde Gardner on October 20, 1931.

Printing

Figure 3:
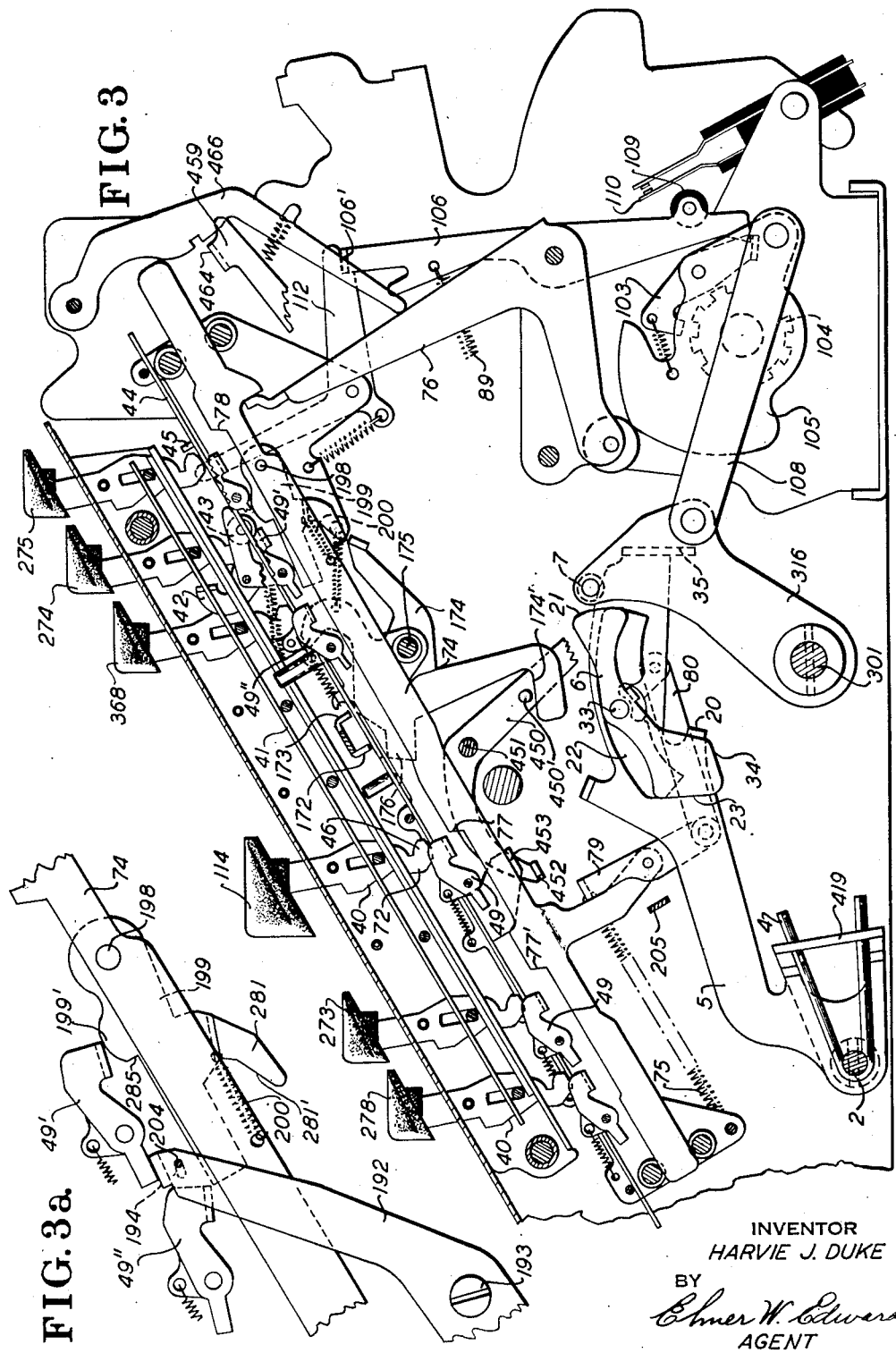
Fig. 3 is a right-hand elevation of parts just inside the right-hand frame, including the operating keys, the registering operations control slide and parts operated thereby.
Figures 14, 15:
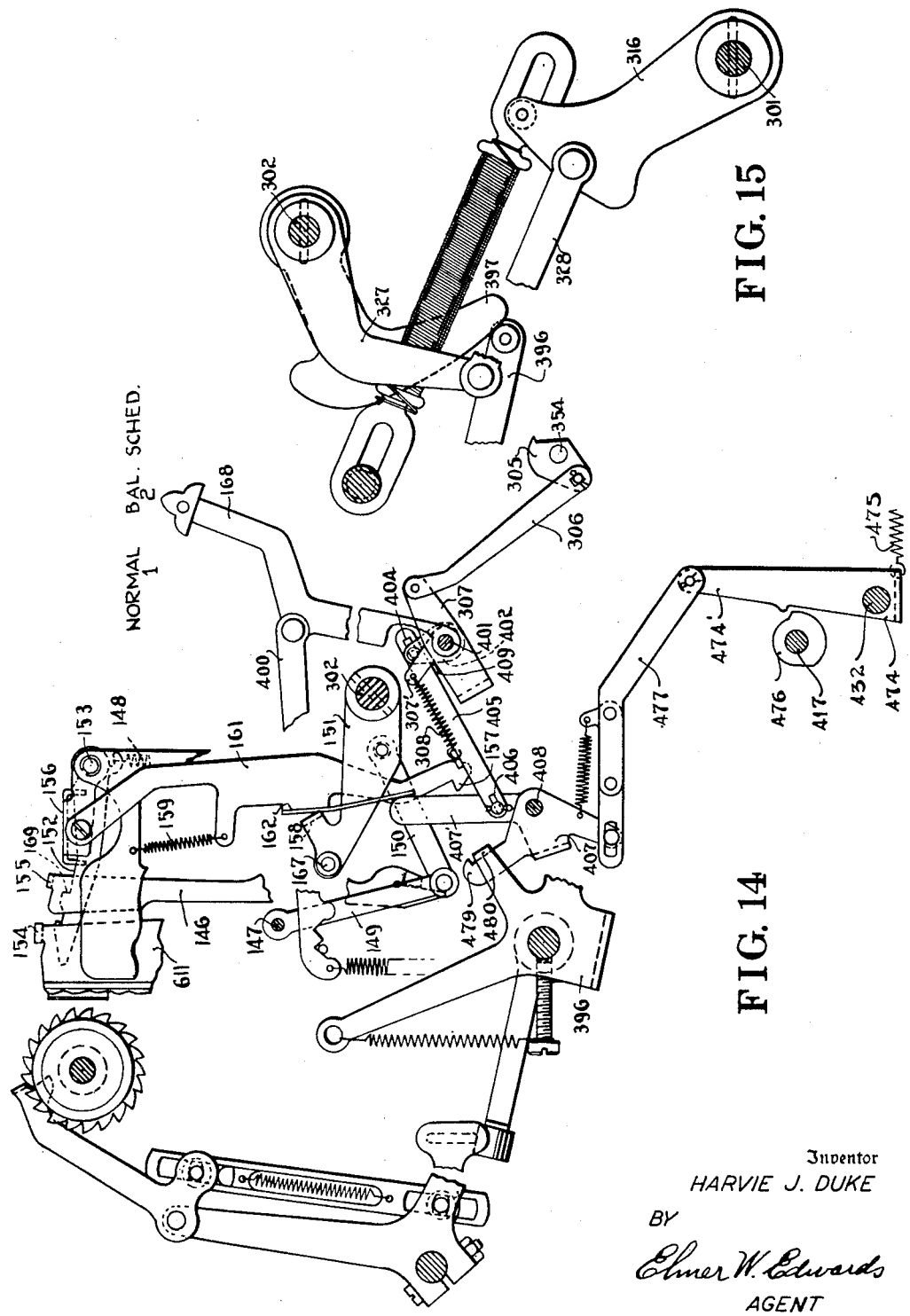
Fig. 14 is a left side elevation of parts associated with control of the printing means.
Fig. 15 is a detail view of a portion of the cyclically operable power devices.

Printing is effected during a cycle of operation upon a record sheet which is inserted around the usual platen 891 mounted within the framing of the carriage in the well known manner. The digit type is solidly set in the type bars 611, and these type bars are normally held in forward position substantially spaced from the platen 891 by means of springs 145 (Fig. 2). Adapted for engagement with the forward face of each type bar 611 is a hammer 146, mounted upon a shaft 147 fixed in the machine frame. The hammers are operated by means of their respective springs 148, and are normally held tensioned by means of a bail 149, suspended from shaft 147 and connected by a link 150 with a rock arm 151 (Figs. 5 and 14). Arm 151 is fast upon a shaft 302 upon which is also fast an arm 327 having link connection 328 with the motor driven arm 316 (Figs. 3 and 15). Thus, upon motor operation, and during the counterclockwise rotation of frame 616, shaft 302 will be rocked clockwise (Fig. 3, counterclockwise Figs. 13 and 14) and bail 149 moves forward slowly permitting any of the hammers 146 which are to be inactive relative to printing to rotate gradually therewith in a clockwise direction until the type bars 611 are forced to a position wherein the type at the printing line will be closely adjacent the surface of platen 891. Bail 149 is held in this position during the printing operation, effective in the active orders as hereinafter described, and is subsequently returned to restore the hammers to normal position. This is the entire operation of any of the hammers 146 located in columns to the left of those wherein keys 215 have been depressed.

Action of the hammers 146 in the active columns is controlled as follows:

A series of latches 152 (one for each hammer 146) is provided, the latches being pivotally mounted upon a shaft 153 fixed in the machine framing, and being urged counterclockwise to latching position by the springs 148, which connect the latches 152 and the hammers 146. Each latch 152 lies beneath a lug 154 of the related type bar 611, and in the normal position of rest of the type bars the latches are held out of engagement with lugs 155 of the hammers 146 by means of a bail 156 supported from shaft 153 and extending across the top edge of the latches. Pivotally secured to the left end of bail 156 is a downwardly extending arm 161 (Figs. 13 and 14) provided with a laterally extending lug 162 underlying the projection 163 of a lever 164 loosely mounted upon the left end of shaft 147. Lever 164 is provided with a cam slot embracing a roller 167 fast to the arm 151 secured to the power operated shaft 302 and is adapted in its normal position of rest to hold bail 156, and thereby latches 152 in depressed position.

During counterclockwise movement of shaft 302 (Figs. 13 and 14) previously described, arm 151 will be rocked downwardly and roller 167 will impart a counterclockwise motion to cam lever 164 to release bail 156, permitting said bail to be rocked upwardly under influence of a spring 159, and the latches 152 will also be permitted a limited upward movement, under influence of their respective springs 148 until stopped by engagement with the projections 154 of the related type bars 611. Upon rotation of an actuator 610, however, and consequent displacement of a type bar 611, the lug 154 of said bar will be moved upwardly away from its related latch 152 which latch will thereupon continue further its upward movement until stopped by engagement with the lug 155 of its related hammer, in which position a shoulder 169 of latch 152 is in the path of movement of lug 155 of the hammer. The engagement of latches 152 with lugs 155 is timed to occur before any substantial movement of the hammers is allowed by bail 149, previously described.

Arm 161 is provided with a depending hook 157 adapted when the machine is used for normal adding listing operations (as determined by the setting of a manually adjusted lever 168 hereinafter described), to be engaged near the extreme forward movement of the actuator drive by a lug 158 of arm 151 and depress bail 156, thereby releasing latches 152 from engagement with the hammers 146. Thereupon hammers 146 will be violently operated by their springs 148, imparting sufficient momentum to the type bars 611 to insure printing engagement of the type with the record sheet.

In order to effect printing of zeros by the type bars to the right of those displaced by the actuators 610, the value printing hammers are provided with the usual overlapping tails 160 (Fig. 2) which serve to hold in spring charged condition the hammers located to the right of one secured by its latch. In other words, a latch 152, upon movement of bail 156, will release its related hammer 146, and all hammers lying to the right thereof, for printing operations as more fully shown and described in the reference patents.

Line spacing means, operable by reciprocatory movement of an arm 396 (Fig. 14) having suitable drive connections 397 with the power shaft 302 (Fig. 15), are also provided, as fully set forth in reference Patent 1,915,296.

Total and sub-total

As well known and fully set forth in the reference patents, in machines of this type totals are printed by first disengaging the actuators 610 (Fig. 2) from their column latches 214 and thereafter from the frame 616 by tripping dogs 617 in successive order from right to left, allowing the racks to move subtractively under influence of their springs 683 to rotate the accumulator wheels to zero, in which position the wheels are held by engagement with appropriate stops. Following this, the cycling of the machine will effect operation of the printing means at the end of the forward stroke of the operating means and thereafter frame 616 will pick up and return the actuators to normal position. Successive release of the racks 610 is essential because of the character of the tens transfer mechanism employed between the accumulator wheels, i. e., the "crawl" carry type, wherein every unit of movement of a lower order wheel transmits one tenth of a unit of movement to the next adjacent higher order wheel. Therefore, in zeroizing, as each lower order wheel is returned to 0 it will subtract from the higher order wheel the fractional movement previously transmitted.

The above and other special functions are effected upon depression of the total key 278, under control of various spring slides 74, 81, 94 and 471 (Fig. 6) lying beneath pivoted bails 49, depressible by their related machine operating key to control the extent of forward movement of said slides as will now be described.

Depression of total key 278 will release slide 44 (Figs. 3 and 7), which overlies slides 74, 81, 94 and 471, to start motor operation as previously described for the other keys and will permit a full movement of the slide 74 to set the operation control means 6 for subtractive operation, that is to say, the accumulator pinions 472 will be left in mesh during the zeroizing operation and will be unmeshed before the additive stroke of the actuators 610 is effected.

It is desired to effect the various adjustments of the controlling mechanisms by power from the motor, and consequently upon depression of the total key the clutch will be allowed a limited driving movement, during which the stop bars 615 will be moved laterally free of the column stops 214, as described more fully later, and then the motor operation will be interrupted to give time for the completion of the zeroizing operation, at the conclusion of which the clutch will be reengaged and the cycle of operation completed. For this purpose, a slide 81 (Fig. 4), which is blocked against operation when bails 49 related to other operating keys are depressed, will be allowed to operate, i. e., move forward, upon depression of the total key, under influence of spring 82. Slide 81 is pivotally connected with a link 83 having pin and slot engagement with a latch 84.

Forward movement of slide 81 is effected simultaneously with the forward movement of lever 76 (Fig. 3), oscillated during each cycle of operation of crank arm plate 105, and link 83 is moved downwardly, tensioning a spring 85 which then tends to move latch 84 clockwise about its pivotal support. The free end of latch 84, however, engages a spring pressed arm 86, pivoted upon the machine frame and having an anti-friction roller 86' engaging the cam edge of plate 105. During the first part of the cycle of operation the roller 86' of arm 86 will ride to and beyond the high point of the plate 105 as the latter rotates, rotating arm 86 clockwise and allowing latch 84 to fall into a notch formed in the upper end of said arm, to maintain the arm in rocked position. A rearward extension 87 of arm 86 is thus held by latch 84 in the path of rotary movement of the clutch pawl 103. Engagement of the pawl with extension 87 serves to disengage the pawl from the driving member 104 of the clutch and to hold it in disengaged position.

The slide 81 also has link connection 88 with an arm 134, pivoted upon a transverse rod 135 mounted in the right and left machine frames and provided with a finger 133 which is brought during movement of slide 81 into contact with a stud 350 fixed in a lever 351 fulcrumed at 352 upon a support arm 353 pivotally mounted on a shaft 354 supported within suitable fixed framing of the machine.

Lever 353 has link connection 355 with an arm 356 pivotally mounted at 357 to the fixed framing of the machine and which constitutes one arm of a toggle means, the other end of which has pivotal connection at 358 with an arm 359 pinned fast to the shaft 354.

Engagement of finger 133 with stud 350 will impart clockwise movement to lever 353 about shaft 354, and through link connection 355 also imparts a rearward movement to toggle 356 sufficient for a suitable spring 360 to complete the rearward movement thereof and in so doing impart a counterclockwise movement (Fig. 4) to the shaft 354. Counterclockwise movement of shaft 354 effects operation of the successive zeroizing devices, in the manner as fully set forth in Patent 2,261,341 and is thereafter restored, following the printing operation at the end of the forward stroke of a machine cycle, by engagement of pin 369 of cam arm 318 with lever 370 fulcrumed to arm 356 at 371.

When the highest order accumulator wheel is rotated to its zero position said zeroizing means imparts clockwise movement (Fig. 4), through suitable link connection (not shown), to a transverse shaft 379 upon the right end of which is an arm 380. Arm 380 is provided with a projection 381 adapted in said movement to engage the lower end of latch 84 and rock said latch out of restraining engagement with arm 86. Arm 86 is thereupon rocked counterclockwise by its spring 85 out of engagement with clutch pawl 103 permitting said pawl to reengage clutch member 104 to restart the interrupted cycle and effect a printing operation in the manner as previously described.

As more fully set forth in reference Patent 2,330,270, in order that the keyboard may be free for the setting up of an item during any portion of the totaling operation, the index bars 615 are designed to be shifted laterally out of position of engagement with the key stems as follows:

The index bars 615 are supported near their ends in sliding plates 90 (Fig. 6) urged toward the right side of the machine by springs 91. The ends of the bars are engaged by a pair of bell crank levers 92, these levers being provided with shoulders 92' engaging projections 93 of the slide 94 (Fig. 5). Slide 94 lies parallel to the slides 74 and 81, and is likewise reciprocated by the operation of lever 76, being moved toward the front of the machine under influence of the springs 91. In add, subtract, and non-add operations, bails 49 of the add, subtract, and non-add keys are depressed into position in front of suitable notched shoulders 95 cut in the slide 94, to prevent operation thereof. Normally, the lever 76 (Fig. 3) through slide 94 will serve to hold the index bars 615 in normal relation to the digit keys 215 and to the zero latches 214 as seen in Fig. 6. Upon forward movement of lever 76 and slide 94 therewith, springs 91 will move plates 90 and index bars 615 toward the right, out of position of contact with the keys and also out of contact with the zero latches 214. The plates 90 operate individually so that there can be no jamming of the parts due to twisting action.

Sub-total key 273 operates precisely in the manner of total key 278, except that slide 74 (Fig. 3) is held in a partially operated position by engagement of the bail 49 related to the sub-total key with a shoulder 77 of the slide. Thus, switch 6 is held in position for a non-add operation whereby the total subtracted from the accumulator wheels is restored thereto during the return stroke of the operating mechanism, all as well known in the art and described in the reference patents.

True negative totals

Overdraft control devices are provided wherein a movement of the highest order (9th column) actuator lever 610 from its 8 to 9 index position will control the means for converting a negative total (registered as the complement of a true negative total) to a true negative total registration and thereafter printing it as such.

Whenever a negative total value has been accumulated upon the register wheels 473, a successive zeroizing operation of the register wheels will include a complemental nines registration carried up to the highest order wheel, and a movement of the highest (9th column) order actuator 610 with its type bar 611 to the nine digit printing position will be utilized to set the true negative total devices into operation in the manner similar to that as set forth in Patent 1,915,296.

As described in said patent, the method of converting a complemental negative total to a true negative total involves three subtractive cycles of motor operation and two total setting actions of the zeroizing devices.

A set of stops 435 (Figs. 2 and 11) yieldably engaging the segments 610 are locked in position as adjusted thereby in accordance with the complemental registration and the segments 610 are thereafter restored idly to normal position. The segments are now again released and will be stopped by the stops 435, the accumulator 473 being meshed during this subtractive stroke of the segments, whereby the complement is subtracted from zero giving a registration of the true negative total. The segments 610 are again restored idly to normal position by a cycle of operation of frame 616, and the stops 435 are released so that a second zeroizing operation will now transfer the true total to the type bars. The printing of the total, which normally occurs at the end of the first total setting operation, has in this case been delayed, and will occur after the true total is set.

Loosely mounted upon a transverse shaft 417, suitably journaled within the left and right hand frames of the machine, is a lever 418, the lower end 418' of which is bent toward the right and then upwardly and around shaft 417. Lever 418 is latched in counterclockwise position as seen in Fig. 11 by the engagement of a projection 420 of a rock plate 412, loosely mounted on transverse shaft 408, with the notched surface 421 of said lever. The 9th order actuator rack 610 in moving frame 8 to 9 index position will engage projection 414 and impart a counterclockwise rocking movement to the plate 412, thereby lifting projection 420 out of engagement with lever 418 and permitting a clockwise movement of said lever. Clockwise movement of lever 418 will set certain control devices for negative total operations, including means for indexing the shaft 417 a quarter of a revolution during a cycle of operation. Fast upon shaft 417 are various cam members which perform certain functions during negative total operations as will be described.

Figure 9:
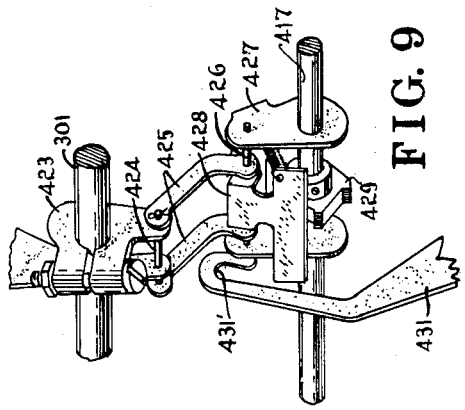
Fig. 9 is a right-hand perspective as viewed underside of the negative total cam shaft indexing means.

The rock shaft 301, cyclically operable as previously described, has fast thereon a U-shaped arm 423 (Figs. 9 and 11) which supports a rod 424 upon which is pivotally mounted parallel links 425. The opposite end of links 425 are pivotally connected to a rod 426 mounted within the end portions of a lever 427, also U-shaped and loosely mounted upon the cam shaft 417. Fulcrumed on rod 426 is a pawl 428, spring held against the peripheral diameter of a four-tooth ratchet wheel 429 secured to the shaft 417. During each machine cycle of operation, a reciprocatory movement is imparted to lever 427 and to pawl 428 about shaft 417. In operations other than when a negative total is to be printed, pawl 428 during this movement will be prevented from engaging with the teeth of ratchet wheel 429 by entering the recessed end 431' of a hook-shaped lever 431. Lever 431 is loosely mounted upon a transverse shaft 432 and is held normally in position to receive pawl 428 by an arm 431'' of lever 431, extending through a suitable orifice of the crossover part 418' of the latched lever 418.

Upon release of lever 418 in a negative total operation, in the manner above set forth, a spring 434 will rock lever 431 counterclockwise, as viewed in Fig. 11, whereupon the end 431' thereof is moved beyond the path of movement of pawl 428, and said pawl in its return movement during the later half of a machine cycle will engage a tooth of ratchet wheel 429 to impart a quarter turn to the cam shaft 417.

For each order actuator 610 provided in the machine, there is a stop member 435 loosely mounted upon a transverse shaft 436 journaled within the framing of the machine. Each stop member is adapted for engagement by the forward end of its corresponding order actuator rack arm 610, so that a movement of said racks to register a value and to bring its related type bar to printing position will be imparted to its related stop member 435. During the first zeroizing operation, therefore, the rack arms 610 in clearing the accumulator wheels 473 to zero will adjust the stops 435 according to the complemental value accumulated upon the accumulator.

Near the end of the forward stroke of the first cycle of operation, cam arm 318 (Fig. 2) fast to rock shaft 301 will engage the projection 437 of a rearwardly extending lever 438, loosely mounted upon shaft 436, rocking said lever downwardly. A projection 439 of lever 438 overlies an arm 440 fast to a notched shaft 441 (Fig. 11) and in the downward movement of lever 438 will impart a clockwise rotative movement to said shaft to bring the flattened portions thereof into engagement with the serrated edges of stop members 435, thereby locking said members in their adjusted positions.

Loosely supported upon shaft 432 is a frame 442 formed as a hook 442' at its left end and provided with an arm 443 at the right end positioned in the path of movement of a cam member 444 fast to the cam shaft 417. During the first quarter turn of shaft 417, in the return stroke of the first operating cycle, cam 444 will rock hook 442' of frame 442 into engagement with arm 438 to latch said arm in depressed position, thereby locking the stops 435 in their adjusted positions, until subsequently released during the return stroke of the second cycle of operation as will be described. A suitable spring tensioned latch 445 will engage projection 437 of lever 438 as said lever is rocked downwardly at the end of the forward stroke of the operation to hold said lever in depressed position while the engagement of hook 442' therewith is being effected in the return stroke. Latch 445 is thereafter disengaged from projection 437 at the end of the return stroke of rock arm 318 (Fig. 5) by means of a pin 446 in said arm engaging the cam surface 447 of said latch.

It will be recalled that near the end of a cycle of operation the crank arm 105 (Fig. 3) acts through bell crank 76 to restore the various operating control slides 74, 81, 94 and 471 to their rearward positions, and that said crank arm through bell crank 65 (Fig. 4), spring 68 and lever 67 also restores operating slide 44 to permit reengagement of latch 112 with clutch lever 106 to terminate a machine cycle of operation. Also, restoration of slide 44 to and beyond its normal rearward position acts to clear the keyboard including a depressed operating key.

So that the machine may continue in cycles of operation, the slide 44 is caused to be latched in forward operating position until the end of the third or printing cycle of operation as follows.

Figure 8:
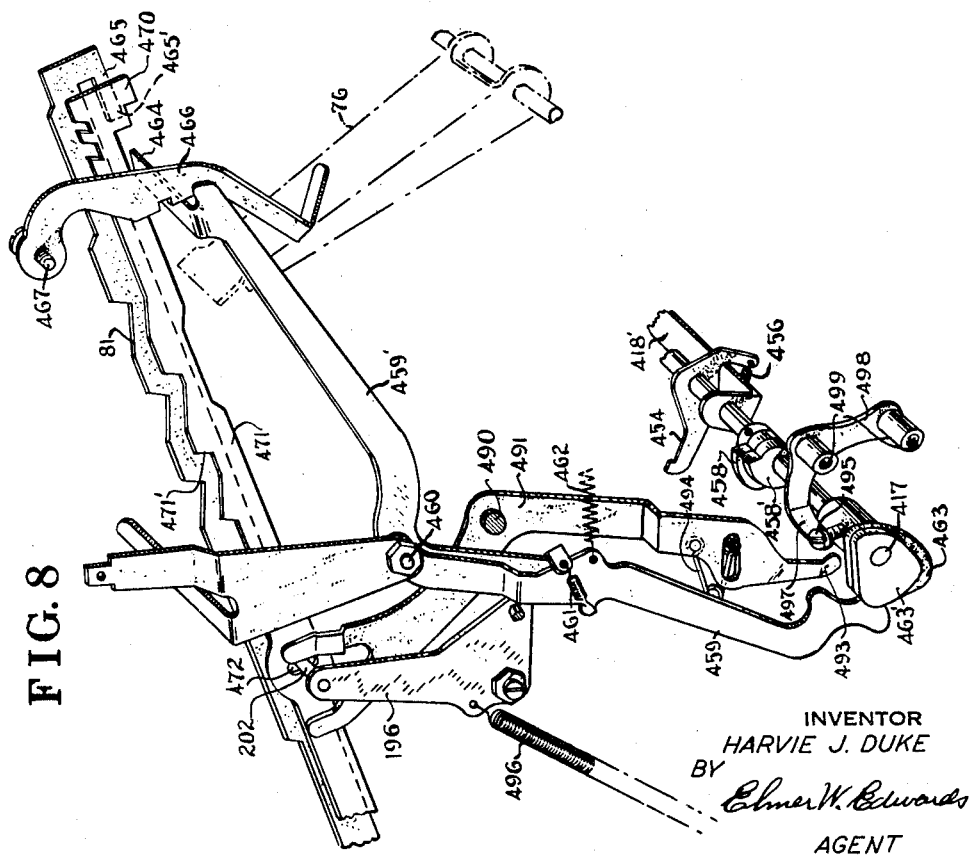
Fig. 8 is a right-hand perspective, looking from the rear of the machine, showing control means for preventing a zeroizing operation during the second cycle of a negative total operation.

Loosely mounted upon shaft 432 (Fig. 11) is a U-shaped lever 448, one end of which has pin and slot connection 449 with a lever 450 fulcrumed to the framing at 451. Lever 450 is provided with a lug 452 normally held in a lowered position out of the path of movement of a projection 453 (see Fig. 17) of the operating slide 44 through means of a latch 454 (Fig. 11) having engagement with a lug 455 of lever 448. Latch 454 is loosely mounted upon shaft 417 and is held in engagement with lug 455 by a spring 456 connected between said latch and the cross member 418' of lever 418 (see also Fig. 8). Upon a clockwise movement of lever 418, previously described, the rearward edge of crossover 418' will rock latch 454 out of engagement with lug 455, permitting a clockwise movement of lever 448 (as seen in Fig. 11, counterclockwise in Fig. 4) by its spring 457 until stopped by the engagement of end 448' of said lever with the lower peripheral diameter of a cam 458 fast to cam shaft 417. The above movement of lever 448 rocks lever 450 to carry lug 452 upwardly into the path of return movement of projection 453 (Fig. 17) of slide 44 to thereby prevent a return movement of the slide, and the total key will thus remain in its depressed position. Also, the relatching of clutch lever 106 by latch 112 is thereby prevented and lever 106 under influence of its spring 89 rocks out of the path of cyclic movement of clutch pawl 103 before engagement of said pawl with lever 106 can be effected. This permits a second cycle of operation during which slide 74 again conditions the operation control means for a subtractive operation.

To prevent a tripping of the zeroizing devices during the second cycle of operation, the control slide 81 (Figs. 4 and 8) will be held in returned rearward position as follows.

Figure 4:
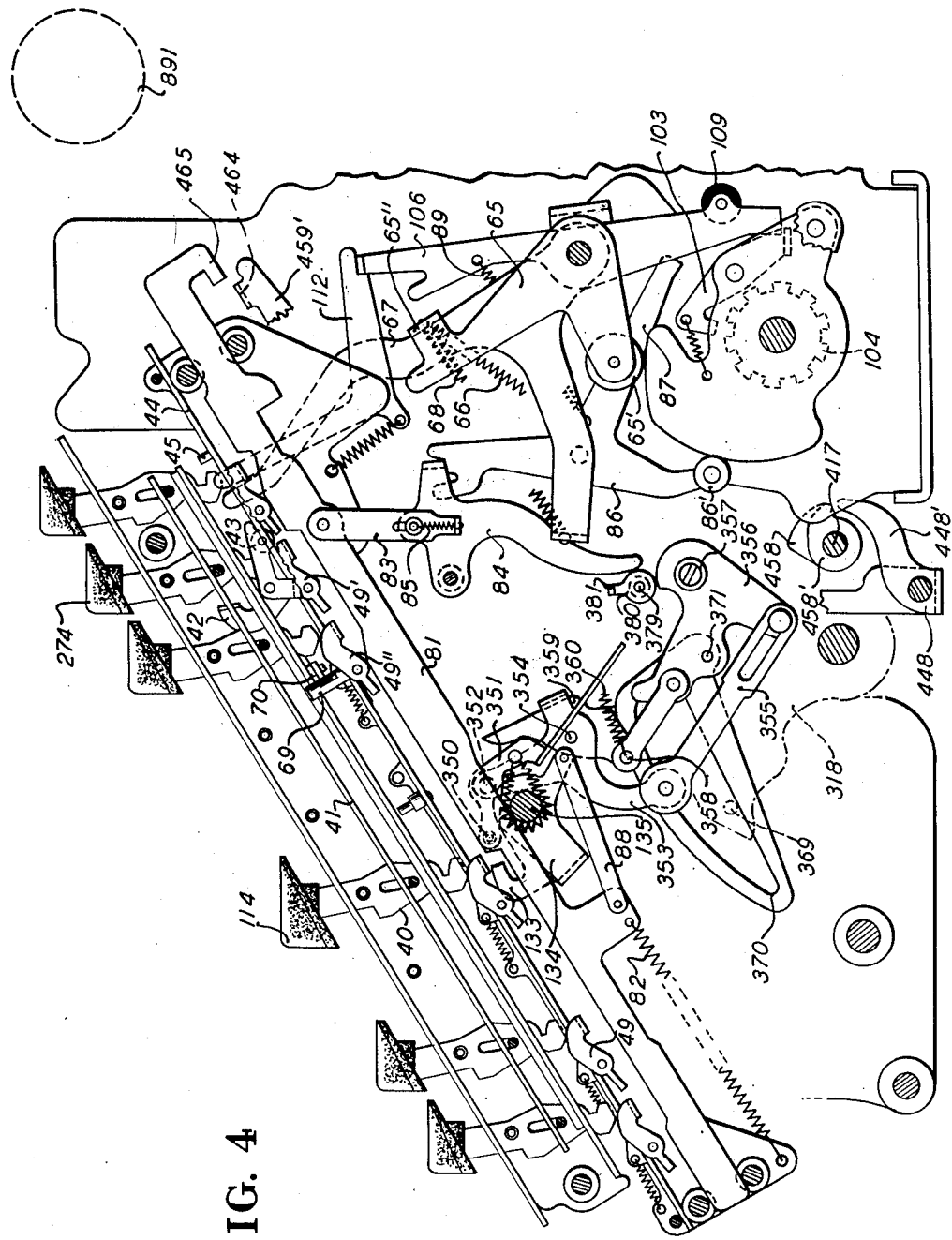
Fig. 4 is a right-hand elevation showing the accumulator zeroizing slide and associated total taking mechanism.

A bell crank lever 459 (Fig. 8) is fulcrumed at 460 upon the right-hand frame of the machine, and is held against a counterclockwise urge of its spring 462 through contact with the largest peripheral diameter of a cam 463 fast to the shaft 417. The rearward arm 459' of bell crank 459 is provided with a lug 464 which extends beneath the zeroizing control slide 81, and is normally held by cam 463 in a downward position out of the path of forward movement of a projection 465 formed on the underside of the rearward end of said slide as shown in Fig. 4.

Indexing of shaft 417 one quarter turn during the first cycle of machine operation, however, will rotate cam 463 bringing an intermediate peripheral diameter surface of said cam opposite bell crank 459, which will permit of partial movement counterclockwise thereof and, as cam 165 subsequently restores slide 81 to its rearward position, the lug 464 will first engage the under surface of projection 465, and thereafter will raise into position to block a forward movement of projection 465, thus holding slide 81 in its rearward position during the second cycle of machine operation.

During the second cycle of operation, rack arms 610 are limited in their forward movement by the stops 435, as earlier set forth, and will subtract the complemental value stored in said stops from the cleared accumulator, thereby leaving a true negative total value stored in the accumulator. On the return movement of the second cycle of operation, cam shaft 417 will again be indexed by pawl 428 a quarter turn to thereby condition the parts for a third cycle, during which cycle a totalizing operation is again initiated to clear the accumulator and cause the true negative total value stored therein to be printed upon the record sheet as will be described. In the indexing of shaft 417 during the second cycle, cam 463 is rotated and will present a lower peripheral diameter to the lever 459. To prevent a movement of lever 459 which would cause a premature tripping of the zeroizing means by releasing slide 81 at this time, lever 459 is prevented from following the contour of cam 463 by means of a spring tensioned latch 466 pivotally mounted upon the framing at 467 and adapted to engage with lug 464 in the described operated position of lever 459. Near the end of the second cycle, however, the slide restoring lever 76 (Fig. 3) will disengage latch 466 from lug 464 and lever 459 will rock further in its counterclockwise direction to carry lug 464 upwardly of the projection 465, so that slide 81 will be permitted to move forwardly in the third cycle of operation.

Indexing of shaft 417 during a second cycle of operation also rotates cam 444 (Fig. 11) away from arm 443 permitting frame 442, under influence of its spring 468, to rock hook 442' out of engagement with lever 433. Near the end of the cycle, therefore, as latch 445 is tripped by arm 318 as previously set forth, notched shaft 441 will be rocked out of engagement with stops 435 by a spring 469 (Fig. 2), permitting said stops to be restored to their normal zero setting positions by their respective springs 443.

Printing and line spacing will be held in abeyance for the first two cycles of operation as follows.

There is loosely mounted upon shaft 432 a bail 474 (Figs. 11 and 14) held in clockwise position against tension of a spring 475 by engagement of the right-hand end of said bail with the crossover portion 418' of the lever 418. Upon release and consequent clockwise movement of lever 418, previously described, bail 474 will rock counterclockwise under influence of spring 475 until stopped by engagement of the upwardly extending left end 474' of said bail with the lower peripheral diameter of a cam member 476 secured to shaft 417. Bail 474 has link connection 477 with a U-shaped latch lever 407 loosely mounted upon support shaft 408, and upon counterclockwise movement of bail 474, link 477 moves rearwardly rocking said latch 407 clockwise. Clockwise movement of lever 407 serves to position a hook end 479 of said lever into the path of movement of a lug 480 of the arm 396 which operates the platen feed devices, and thereby blocks movement of said arm to prevent a line spacing operation. Also the clockwise movement of lever 407 serves to position hook end 157 of lever 161 out of the path of movement of lug 158 to prevent the operation of the printing hammers previously described.

Indexing of shaft 417 during the later half of the second cycle of operation, however, rotates cam 476, and said cam at this time will restore bail 474 clockwise and thereby rock hook end 479 from the paper feed arm 396 while permitting spring 159 to restore the printing hammer control arm 161, so that the printing and paper feed devices will be free to operate during the third cycle of operation.

Since clutch operating slide 44 is still latched in its forward clutch releasing position by lever 450, the machine will continue to operate for a third cycle during which the various operating control slides 74, 81, 94 and 471 are again caused to move forwardly and control the character of registration, tripping of the zeorizing means and a lateral adjustment of frames 90 which support the stop bars 615, all as in the manner set forth for the first cycle of operation. Operation of the zeroizing means incident to the third cycle of operation, however, now positions the type bars 611 according to the true negative total value stored in the accumulator wheels 473. Printing and line spacing means is also effective for operation as above set forth and the true negative value is printed upon the record sheet at the end of the forward stroke, and the paper feed devices are operated during the return stroke, in the well known manner previously described.

Special means are provided to index cam shaft 417 a quarter turn to its three-quarter turn position during the forward stroke of the third cycle of operation, following which the regular indexing means will operate on the return stroke to rotate the shaft a fourth quarter turn to its normal position.

Figure 10:
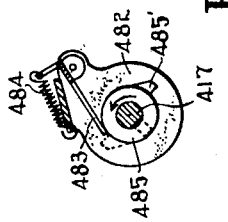
Fig. 10 is a detail view of special means for indexing the negative total cam shaft from one-half to three-quarter turn position.
Figure 17:
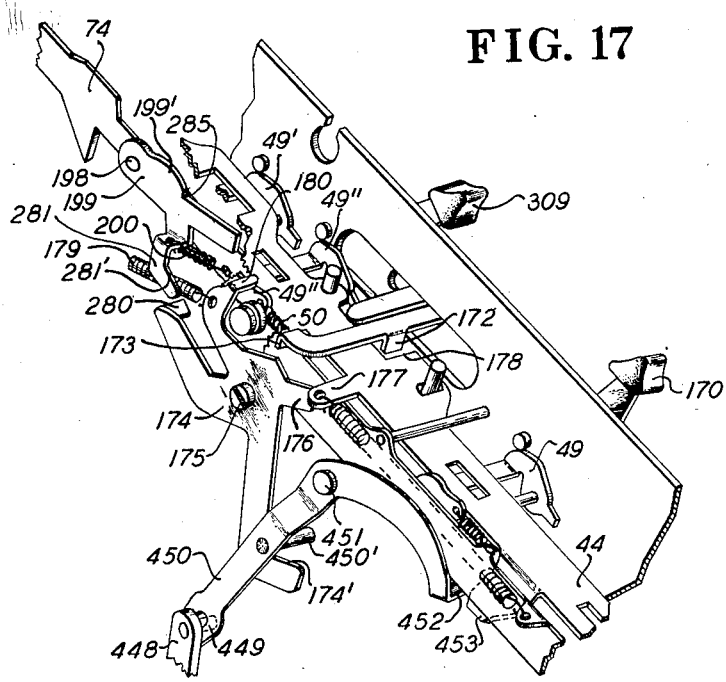
Fig. 17 is a left-hand perspective showing means for controlling the registering and cycle starting control slides; and, Fig. 18 is a detail right-hand elevation of certain parts for controlling automatic balance scheduling operations.

Loosely mounted upon shaft 417 is a U-shaped lever 482 (Figs. 10 and 11) within the end supports of which is pivotally mounted a pawl 483 held by means of spring 484 against a one-tooth ratchet wheel 485 fast to the shaft 417. Lever 482 has link connection 486 with the power operated arm 318, so that during a forward movement of said arm the lever 482 will carry pawl 483 in an arc around wheel 485, equivalent to one-quarter turn, and thereafter is returned during the return movement of arm 318. The tooth 485' of ratchet wheel 485 is normally in the position illustrated in Fig. 10 out of cooperation with pawl 483 during the first and second cycles of operation. At the end of the second cycle, however, shaft 417 having been rotated a half revolution, the tooth 485' will have passed under pawl 483 and will be in the position illustrated by dotted lines. During the forward stroke of a third cycle, therefore, pawl 483 will engage tooth 485' and rotate shaft 417 from its half to a three-quarter rotated position. During this movement of shaft 417, a higher peripheral diameter of the cam 458 (Figs. 4 and 11) is positioned opposite end 448' and rocks lever 448 clockwise to thereby restore lever 450, disengaging the projection 452 of said lever from the projection 453 of operating slide 44 (Fig. 17). Slide 44 is now free to be subsequently returned to its rearward position during the return stroke of the cycle, and permit reengagement of the latch 112 with clutch lever 106 to stop the machine at the end of the cycle as earlier described.

During the operation of shaft 417 by pawl 483, the cam 463 (Fig. 8) rocks the lower part of lever 459 flexing the spring 461, and as control slide 81 is subsequently restored to rearward position by lever 76, projection 465 is carried rearwardly of lug 464 and, upon release of latch 466 by lever 76, spring 461 restores the lever 459' to its normal position wherein lug 464 is again positioned below the path of movement of projection 465.

In the manner previously set forth shaft 417 is now again indexed on the return stroke of the machine a quarter turn to thereby complete one revolution and is again in its normal or starting position. During the final quarter operation of shaft 417 a cam 487 secured thereon will wipe past roller 488 of lever 431, restoring said lever and, through projection 431'', the overdraft control lever 418 to their normal positions, wherein lever 418 will again be reengaged with latch 420, and holds lever 431 in the position to prevent operation of shaft 417 by the indexing pawl 423. Restoral of lever 418 will also permit reengagement of latch 454 with lug 455 of lever 448 prior to the release of said lever from the high part of cam 458. Also lever 418 will reengage with lever 474 prior to the release of end 474' of said lever from the high part of the cam 476, and all parts are now again at their normal position of rest. A suitable spring tensioned locator means 489 is provided as shown in Fig. 11 to hold shaft 417 in each of its indexed positions.

Negative sub-totals

As in the well known Monroe adding listing calculator, which employs an improved embodiment of the devices of U. S. Patent No. 2,050,302, negative sub-total operations are performed by first zeroizing the accumulator wheels and transferring the complemental value registered thereon into the stops 435 during the first machine cycle of operation, then subtracting the complemental value from the cleared accumulator wheels during a second machine cycle leaving the wheels with a true credit balance registered thereon, a second totalizing operation then again clears the wheels and transfers the true credit balance value to the stops 435 during the third machine cycle of operation, and a fourth machine cycle of operation thereafter prints the true negative total value and subtracts said value from the cleared wheels, leaving the wheels with the complement of the true negative total value again registered thereon.

To simplify the description it will be understood that, except as hereinafter described, the overdraft devices will function during the first three cycles of the negative sub-total operation in the same manner as fully set forth for a negative total operation. A negative sub-total operation, however, utilizes four cycles of machine operation in contrast to three cycles as used for negative total operations. The timing, therefore, of certain functions during negative sub-total operations must be delayed to a cycle subsequent to that as employed in negative total operations, as hereinafter described.

Cams 476, 444, 458 and 463 on the negative total shaft 417 are formed as double edged cams, the cam edges 476', 444', 458' and 463' being adjacent on the right and located around shaft 417 so as to effect a timing of the sequence of operations of the overdraft control devices earlier described to occur as follows.

In order that no printing will be effected on the first, second and third cycles of operations cam 476' will not operate lever 474 to effect a release of the printing disabling devices until the return stroke of the third cycle of operation, whereupon said printing means is then free to be operated during the fourth cycle of machine operation, in the manner previously described for negative total operations.

The cam 444' is adapted to operate latch 442 to lock segments 435 in their adjusted positions in the first and third cycles of operations so that in the second cycle of machine operation said segments may control the extent of a subtractive operation of the accumulator wheels in accordance with the complemental value stored in the segments and during the fourth cycle of operation said segments will limit the subtractive movement of the accumulator wheels in accordance with the true negative total value stored in said segments.

So that the machine will continue in operation for a fourth cycle the cam 458' will not act to restore projection 452 out of engagement with projection 453 of the starting slide 44 until the return stroke of the fourth machine cycle. Projection 452 also rocks a pawl 461, pivotally to the operations control slide 74, out of cooperation with the depressed sub-total bail 49 until restored by the cam 458' so that slide 74 may be free to move forward each cycle and set cam switch 6 to control a subtractive operation of the accumulator wheels for all four sub-total cycles of operation, pawl 461 in normal position being adapted to limit slide 74 for a non-add control operation, as called for in normal sub-total operations.

To prevent slide 81 (Figs. 4 and 8) from tripping the totalizing means during the second and fourth cycles of operation, cam 463', when shaft 417 is indexed on the first and third cycles of operation, will permit spring 462 to adjust lever 459 counterclockwise, so that during the second and fourth cycles of operation the projection 464 will be adjacent projection 465 of slide 81 and prevent the forward movement of said slide. At such times projection 464 will also lie in the path of movement of a projection 470 of the character symbol control slide 471 so that the symbol type bar is caused to be positioned to print the negative sub-total symbol during the fourth machine cycle.

Means for shifting the cam shaft 417 toward the left to displace the negative total cams out of effective position and to bring the negative sub-tital cams into effective position will now be described.

Figure 18:
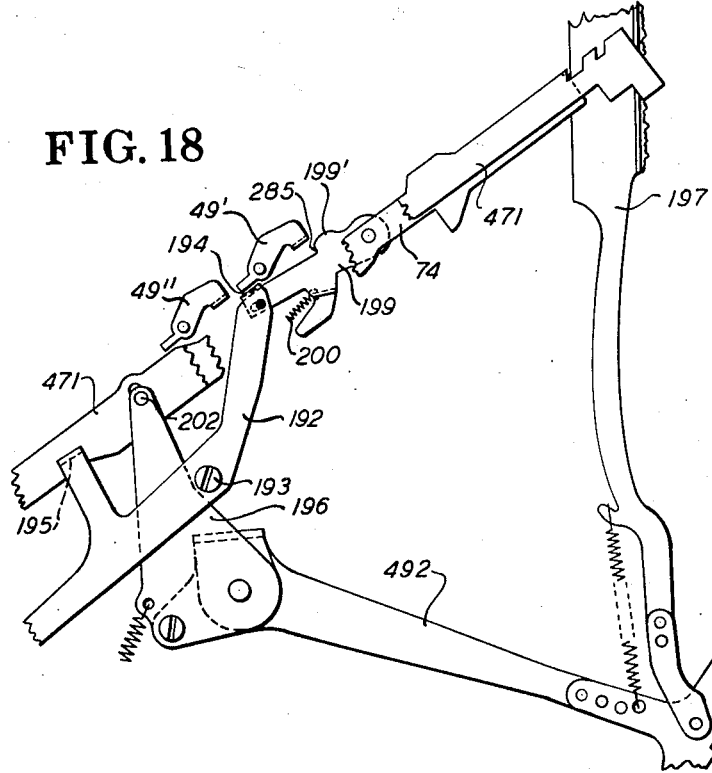

To the inside face of the right-hand side frame is pivotally mounted at 490 a lever 491 provided with a bifurcated end embracing a pin 262 fast to an arm 196 of the character symbol type bar arm 492 (Fig. 18), said pin also extending through a suitable slot 472 in the symbol control slide 471. The lower end 493 of lever 491 is bent leftward to form a cam surface and said lever is normally held by means of a suitable toggle spring 494 in a clockwise direction as viewed in Fig. 3 so that the cam face 493 is normally out of the path of rotation of a stud 495 fast to cam shaft 417.

During the forward stroke of a machine operation the character symbol slide 471 is normally permitted to move forwardly, under influence of spring 496, until stopped by engagement of suitably spaced shoulders 471' with a related bail 49 which has been depressed by an operating key to bring the appropirate symbol type to the printing line position. In a sub-total operation slide 471 is permitted to move forward sufficiently so that said slide through slot connection 472 will move pin 262 forwardly into engagement with the forward prong of lever 491 and rock said lever counterclockwise sufficiently for toggle spring 494 to complete the movement. Counterclockwise movement of lever 491 serves to bring cam end 493 into position for a subsequent engagement by stud 495 of shaft 417 as said shaft is indexed in the return stroke of the first cycle of operation following an overdraft signal, as previously described. During said indexing of shaft 417 stud 495 is carried around with said shaft and engages cam end 493 of lever 491 forcing shaft 417 toward the left sufficiently so that the cams controlling negative total operations will be moved to ineffective position while the cams controlling negative sub-total operations are brought into effective position.

Cam shaft 417 is held in displaced position by friction of spring locator 489 (Fig. 11) until returned toward the right by engagement of stud 495 (Fig. 8) with a suitable cam surface 497 formed by the rightward bending of the forward end of a blank 498, fast at 499 to the inner face of the right-hand framing of the machine.

*Manual balance scheduling operations*

Balance scheduling operations may be performed by 39 manual operations in the following manner, and as more fully set forth in copending application Ser. No. 235,453, or automatically in the manner hereinafter to be described.

As illustrative of one form of work to which the invention is adapted, it is desired in a contract or loan having equal monthly payments to list first the monthly payments in one column of the record form and thereafter to schedule the unpaid balances in a second column as a reducing balance, together with the month dates in which payments are due.

Example: Contract of $144.00 starting in May, payable in 12 monthly installments of $12.00 each.

With reference to Fig. 14, lever 168 is fast upon the left end of a transverse shaft 401 supported within the machine framing and is adjusted manually to either of two positions for controlling normal listing operations or balance scheduling operations. A suitable spring tensioned click 400 serves to hold lever 168 in either adjusted position. Also fast upon said shaft is an arm 402 having pin and slot connection 404 with a link 405, connected at its opposite end by pin and slot connection 406 with lever 407 fulcrumed upon rod 408. Arm 402 in the rearward normal operations setting position of lever 168 engages with a projection 409 of link 405 and holds said link in its rearward position, thereby also holding lever 407 rocked in a position counterclockwise of that shown in Fig. 14. The upwardly extending arm 407' of lever 407 has engagement with an extension of the projection 162 of arm 161 and in the counterclockwise position of lever 407 arm 161, under influence of its spring 159, will be positioned so that hook 157 will lay in the path of movement of the projection 158 of rock arm 151.

During normal adding listing operations, therefore, projection 158 engages hook 157 thereby depressing arm 161 and the bail 156 to release latches 152 and effect operation of the printing hammers in the manner as previously described.

This would be the operation wherein an amount representing a monthly payment (in the present example, $12.00) is set up on the keyboard and repeatedly accumulated while being successively listed in a column upon the record form, the operating key 114 in the present instance being held by the operator for twelve machine cycles of operation.

As earlier described a rearward setting of non-clear lever 170 (Fig. 1) disables the automatic keyboard clear means, thereby preventing a clearing and consequent resetting of the keyboard between the listing of payments and balance scheduling operations.

Loosely mounted upon the right-hand end of the accumulator shaft 403 (Fig. 12) is a month printing control wheel 410 provided with a twelve tooth pinion 411 adapted for engagement with a spring actuated lever 610', similar to the actuator levers 610, and also loosely mounted upon shaft 608.

The rearward arm of lever 610' has pivotal connection with a type bar 611' provided with a longitudinally disposed series of type representing the months from Jan. to Dec. An elongated pin 610'' is fast to the upper arm of lever 610' and provides for both a laterally slidable and a pivotal connection of said lever with an index bar 615', said bar being slidably supported within the support plates 90 previously described. Bar 615' has eleven projections 615'' adapted for cooperation with the stem of any selectively depressed month key 415 to limit a forward movement of lever 610' during operative cycles of the machine, in the manner as fully set forth for the actuator levers 610 of accumulator wheels 473.

There are eleven month date keys 415, similar to the digit keys 215, bearing the designations Jan. to Nov. and the numbers 1 to 6 reading from November back to June as shown in Fig. 1. For the 12th, i. e., December month, no steps of movement are imparted to actuator lever 610'; therefore, no key is necessary for the month of December.

It will be obvious that depression of a month key coincident with a start of the final listing cycle will cause adjustment of the month control wheel 410 during the final listing cycle of operation to a desired month starting position, as determined by the selected month key.

Special means to be described are provided, however, to prevent a printing of the month date during the adding listing operations.

Near the right end and loosely mounted upon shaft 401 of setting lever 168 is a rearwardly extending arm 361 (Fig. 2) having spring connection 362 with a spring stud 363 projecting from a collar 364 fast upon shaft 401. In the rearward, adding, listing, position of setting lever 168 arm 361 is rocked to a position clockwise of that illustrated in Fig. 2 and will engage a pin (not shown) secured in the month printing hammer 146' to block a printing movement of said hammer.

Arm 361 has yieldable spring connection 365 with a second arm 366 mounted loosely upon shaft 401 and adapted in the adjustment of arm 361 to be moved into and out of engagement with a pin 367 of the printing hammer 146'' (broken away) related to the usual plus, minus, total symbol printing type member. Thus a setting of arm 361 by movement of lever 168 to "normal" position will permit of an operation of the usual symbol printing hammer 146'' and will block operation of the month printing hammer 146' while adjustment of lever 168 to "Balance Schedule" position serves to prevent operation of the usual symbol printing means and permits of operation of the date month printing means.

The twelve monthly payments of $12.00 having thus been accumulated and listed and the month date control wheel now set to a starting month position, the paper support carriage is then shifted to the "Balance" column and the first posting line brought back to the printing position preparatory to scheduling the unpaid balances.

Lever 168 (Fig. 14) is now moved forward to "Balance Schedule" position, during which movement arm 402 through link 405 and lever 407 will adjust hook 157 forwardly out of the path of movement of lug 158 to disable operation of bail 156 and thereby prevent an operation of any of the printing hammers.

Reducing balance scheduling by manual operations is performed by alternate use of a (BAL) key 368 (Fig. 1) and the minus key 274. Balance key 368 is a duplicate sub-total key positioned for convenient operation adjacent the minus key 274 and adapted upon depression to cause a sub-total operation as in the manner previously described for sub-total key 273.

In the present instance, however, the means previously described for zeroizing the right-hand register wheel 473 is now applied to normalizing the month date wheel 410 and the successive action of the totalizing devices thereafter zeroizes the accumulator wheels 473 as described.

Means are provided whereby an operation of the total taking devices will readjust hook 157 to re-enable the printing means so that a printing of the unpaid balance and of the related month dates may be effected during balance scheduling cycles of operation.

Secured to shaft 354 (Fig. 14) is an arm 305 having link connection 306 with a bail 307 loosely mounted upon shaft 401 and having an upwardly extending arm 307' engaging projection 409 of link 405. Link 405 is urged forwardly by means of a spring 308 connected at one end to arm 307 and at the opposite end to a suitable lug of link 405. As heretofore described, during totalizing operations, the shaft 354 is first caused to be rocked in a clockwise direction (Fig. 14), and thereafter is restored following release of the printing means. Clockwise movement of shaft 354, through arm 305, link 306, bail 307, and link 405, rocks lever 407 and arm 407' to release lever 161 for movement by spring 159 to thereby readjust hook 157 to effective position for engagement by lug 158. During operation of rock arm 151 in balance scheduling cycles of operation lug 158 engages hook end 157 to depress bail 156 and release latches 152 to effect a sub-total value printing operation as heretofore described and to also print therewith the starting month date as set up in the control wheel 410. Following the printing operation the shaft 354 will be restored to normal position by engagement of pin 369 with lever 370 as in the manner previously described and hook 157 is moved out of cooperative relation with lug 158 to again render the printing means ineffective. At the completion of the above operations the record sheet will read as follows:

| Balance | Due | Payment | Date Paid |
|---------|-----|---------|-----------|
| $144.00 | May | $12.00  |           |
|         |     | 12.00   |           |
|         |     | 12.00   |           |
|         |     | 12.00   |           |
|         |     | 12.00   |           |
|         |     | 12.00   |           |
|         |     | 12.00   |           |
|         |     | 12.00   |           |
|         |     | 12.00   |           |
|         |     | 12.00   |           |
|         |     | 12.00   |           |
|         |     | 12.00   |           |

The balance of $144.00 remains stored in the register wheels 473 and the month date wheel 410 remains set to the "May" month date starting condition.

In the illustrated example the month date printing is to progress one month at a time; therefore, the date key marked Nov. is now depressed, during which setting the depressed starting month key MAY is automatically restored in the usual manner, well known for flexible keyboards.

A subtractive cycle of operation initiated by depression of minus key 274 will now subtract $12.00 from the $144.00 stored in accumulator wheels 473, in the well known manner previously described, during which operation the hook end 151 remains in the miss position relative to projection 158 and consequently no printing action will occur.

During the subtractive cycle of operation, the projection 615'' (Fig. 12) related to the Nov. key will provide for eleven steps of forward movement to the bar 615'. Twelve steps of movement of bar 615' is required to impart a complete cycle of rotation of month wheel 410. Therefore, at the completion of the subtractive cycle of operation wheel 410 will have been rotated in a clockwise direction (Fig. 12) 11/12ths of a revolution, or one step less than a complete cycle of rotation. At the end of each subtractive cycle of operation, therefore, wheel 410 will stand indexed in a counterclockwise direction one step further from the initially set MAY month starting position. Thus during alternate subtract and sub-total operations wheel 410 is indexed one step during each of the subtractive cycles of operations and will adjust type bar 611' in the subsequent sub-total cycles of operations to control a printing of the month symbols in consecutive monthly sequence, from the selectively set starting month position. At the completion of the scheduling operations the record sheet will appear as follows:

| Balance | Due | Payment | Date Paid |
|---|---|---|---|
| 144.00 | May | 12.00 | |
| 132.00 | June | 12.00 | |
| 120.00 | July | 12.00 | |
| 108.00 | Aug | 12.00 | |
| 96.00 | Sept. | 12.00 | |
| 84.00 | Oct. | 12.00 | |
| 72.00 | Nov. | 12.00 | |
| 60.00 | Dec. | 12.00 | |
| 48.00 | Jan. | 12.00 | |
| 36.00 | Feb. | 12.00 | |
| 24.00 | Mar. | 12.00 | |
| 12.00 | Apr. | 12.00 | |

So that the accumulator wheels 473 will be cleared and the month date control wheel restored to normal position at the end of the scheduling operation, the final scheduling operation (12th in the cited example) is made with the total key 278, in preference to the balance key, the totalizing devices operating in the well known manner previously described.

In the event the operator does not depress the total key to initiate the final scheduling operation, it will be necessary to clear the machine by a subsequent total taking operation before scheduling another contract. To clear the machine without effecting a printing on the record form, however, a lever 430 (Fig. 13) pivotally mounted upon the right-hand end of shaft 153 is provided. Secured in lever 430 is a pin 430' overlying the bail 156 and by manually holding lever 430 rearwardly during the clearing operation pin 430' will hold bail 156 in depressed position to prevent the engagement of latches 152 with the printing hammers. Thus the hammers will be permitted to move forward slowly to their ineffective printing position during the machine cycle of operation so that no printing action will take place, as previously described.

It may be that by agreement scheduled unpaid balances are to be reduced by payments made only every other month, in which case the key marked Oct. would be depressed in lieu of the Nov. key. This would permit a ten step movement of actuator 610' which has the effect of indexing the month wheel two steps forwardly for each operation. Quarterly payments would require use of the key marked Aug. to limit movement of actuator 615' to eight steps which effects a forward indexing of wheel 410 four steps each operation, etc. Thus, the rate by which wheel 410 is caused to be indexed forwardly in a reducing balance scheduling operation may be determined by a selection of the appropriate key 415.

It is also desirable first to list the deposits or payments in a column and thereafter to schedule the balances on an accumulative basis, as distinguished from a reducing balance schedule.

This is accomplished manually by the alternate depression of the balance key 368 and the plus bar 114 in which the operation is similar to that as described for a reducing balance schedule. The totals which were accumulated upon wheels 473 during the process of listing the payments, however, will first be cleared from the accumulator wheels by a total key operator in a listing of the amount of the loan upon the record sheet prior to the start of a scheduling operation. Thereafter, the carriage is placed in the balance column position and a starting month is set up on the month keys 415 and entered upon wheel 410 by a plus bar cycle of operation in the manner as heretofore described.

During each accumulative balance scheduling cycle of operation, the accumulator wheels 473 are now operated in an additive instead of a subtractive direction as was described for the reducing balance scheduling operations. The scheduling of the month dates, however, will progress in a forward sequence (Jan to Dec) in either form of operation. This is accomplished in accumulative balance scheduling cycles of operations by the use of the month date keys to limit the forward movement of lever 610' while the control wheel 410 remains out of engagement with the actuator lever 610'. As previously described, in additive cycles of operation, shaft 403 is moved to brink accumulator wheels 473 into engagement with racks 610 prior to a return movement of said racks, and date control wheel 410 moving with shaft 403 also engages rack 610' to be subsequently indexed in a counterclockwise direction (Fig. 12) in the return movement of said rack in accordance with the depressed month key.

During the balance scheduling sub-total operations, which may be initiated by depression of either balance key 368 or the sub-total key 273 therefor, amounts accumulated upon accumulator wheels 473 are listed as accumulative balances together with their progressively listed related month dates, the various operating and printing control devices functioning in the manner as heretofore described in connection with reducing balance scheduling.

The arrangement of successively alternately indexing the month date control wheel in accordance with a selected month date key which remains set during adding or subtractive cycles of operation together with a control by said wheel for adjusting the printing type during the totalizing operations requires that actuating lever 610' and index bar 615' for control wheel 410 be free to move during totalizing operations without conflict with any depressed month date key 415. This is accomplished by mounting bar 615' within the laterally shiftable support plates 90 and providing a sliding engagement of bar 615' with a pin 610'' of lever 610'.

As in the manner earlier set forth, during a totalizing operation the plates 90 will move laterally toward the right and will carry bar 615' therewith out of register with the stem of any depressed key 415 before a forward movement of the bar 615' takes place and are thereafter restored following the return movement of said bar.

At the completion of a balance scheduling operation, the keys 215 and 415 may be cleared by means of a manually operated clearing lever 309 (Figs. 1 and 16) in well known manner preparatory to setting up a new contract.

In most cases payments are made on a regular monthly basis. However, it may be required that a contract be made with someone whose income is seasonal and, by agreement, no payment is to be made during certain months. Under such conditions, the month control wheel may be indexed to the next payment period by taking advantage of the previously described ability to progress the month date wheel for various pluralities of steps of progression.

Automatic reducing balance scheduling operation

As earlier set forth, the present invention provides means for accomplishing a balance scheduling operation automatically so that the operator is not required to make the repeated operations of the control keys above described. The invention also includes means for modifying an operation of the negative sub-total devices for the purpose of automatically terminating a reducing balance scheduling operation in such manner that the accumulator and the keyboard setting are cleared and ready for the next account.

Means are also provided whereby an automatic scheduling operation may be manually terminated or interrupted and restarted again at will, to be continued either in manual or automatic operations without requiring a resetting of the keyboard.

For automatic balance scheduling operations the means and mode of operation for the listing and accumulation of monthly payments, the positioning of the month wheel to a starting month condition, and the setting up and control of month indexing are all as described heretofore for manual balance scheduling operations.

It will be recalled that for manual balance scheduling operations the keyboard clear, non-clear lever 170 (Figs. 16 and 17) is set in its rearward non-clear position, and that a lug 172 of said lever acts to prevent the return movement beyond normal position of starting slide 44, and thereby disables operation of the keyboard clearing means.

In machines adapted for automatic balance scheduling operations the lever 170 is provided with a second lug 173 which during a manual balance scheduling operation is adapted in the rearward setting of said lever to engage the top edge of a lever 174 (Fig. 17) at a point forward of the screw stud 175 which pivotally secures said lever 174 to the framing of the machine. Lever 174 is thereby held in a clockwise position so that a forward projection 176 of said lever will be held downwardly out of the path of movement of a projection 177 of the operating slide 44.

For automatic balance scheduling operations the lever 170 is manually adjusted to its forward, i. e., clearing position, lifting the lug 172 out of the path of movement of shoulder 178 of operating slide 44, and lug 173 is also lifted away from lever 174. The lever 174 is biased for counterclockwise movement by a spring 179 but is prevented from rocking when the balance key 368 is in normal raised position by means of a lug 180 which extends over the bail 49'' related to the balance key, the spring 50 of said bail being stronger than the spring 179 of lever 174.

A second lever 182 (Fig. 16) pivotally mounted at 181 to the framing of the machine is adapted in its forward setting to control automatic reducing balance scheduling operations, and upon a rearward setting to control automatic accumulative balance scheduling operations, as will be described. Levers 170 and 182 are held in their adjusted positions by means of suitable toggle springs 183 and 184 respectively.

With levers 170 and 182 set in their forward positions for an automatic reducing balance scheduling operation and the amount of payments together with a starting month date having been accumulated upon the register wheels and the payments listed upon the record sheet, in the manner as earlier described, the operator need now but to depress the balance key 368 once only. The machine thereafter will continue in operation, automatically sub-totaling to print the balance due and month date, followed alternately by an automatic subtract cycle to reduce the payments from the accumulator wheels and to index the month wheel, as in the manner set forth for manual balance scheduling operations.

As previously described, depression of the balance key 368 lifts roller 43 (Fig. 3) to release starting slide 44 for a forward movement to trip the operating clutch for a cycle of operation. During the cycle the control slides 74, 81, 94 and type symbol slide 471 (Fig. 6) move forwardly until stopped by engagement of suitably spaced shoulders of said slides with the depressed balance key bail 49'', which provides for a sub-total operation. In the present invention, however, slide 74 in lieu of a fixed shoulder related to the balance key bail 49'' is now provided with a pawl 199 (Fig. 17) pivoted thereto at 198. Pawl 199 is held in raised position by a spring 200 so that the forward edge of said pawl is in position to engage the depressed bail 49'' of the balance key and limit forward movement of slide 74 to condition switch 6 for a non-add operation, as normally called for in sub-total operations.

As earlier set forth, with lever 170 in its forward clear position the operating slide 44 would normally restore to and beyond normal position for the purpose of restoring the operating key and to clear the keyboard setting. In the present invention, however, bail 49'' in moving downwardly upon depression of the balance key moves away from the projection 180 of lever 174, permitting spring 179 to rock lever 174 counterclockwise, as viewed in Fig. 17. Counterclockwise movement of lever 174 positions the projection 176 into the path of movement of projection 177 of slide 44, thereby preventing the return movement of said slide and consequently, even though lever 170 is set to clear position, both the clearing of the keyboard and restoring of the balance key is prevented and the machine will continue in operation.

For reducing balance scheduling operations the following means are provided to condition the machine automatically to perform a subtractive cycle of operation following each sub-total operation.

Pivotally secured at 185 to the machine framing is a lever 186 urged counterclockwise (Fig. 16) by a spring 187 and provided with a rearwardly extending arm 188 having a lug 189 engaging the rearward edge of lever 182. In its forward reducing balance schedule position lever 182 acts to hold lever 186 rocked partially in a clockwise condition so that arm 188 will be positioned with a shoulder 190 of said arm beneath a lateral offset 191 of a lever 192 pivoted to the framing at 193. A projection 195 of lever 192 extends leftwardly into the path of movement of the arm 196 of the character symbol type bar 197 (Fig. 18) and during a balance scheduling sub-total cycle of operation slide 471 before contacting bail 49″ will permit arm 196 to move forwardly, under influence of its spring 203, a sufficient distance to engage projection 195 and rock lever 192 in a counterclockwise direction beyond toggle center so that spring 204 will complete the movement of lever 192 until stopped by engagement of offset 191 with the shoulder 190 of arm 188. On the rearward end of lever 192 is formed a lug 194 which extends beneath the forward end of the bail 49′ (see also Figs. 6 and 18) related to the subtract operating key 274. During the above described movement of arm 192, lug 194 depresses bail 49′ to an intermediate position wherein said bail will lie in the path of movement of a cam surface 199′ formed upon the upper edge of the pawl 199 fast to the operations control slide 74, previously described. As slides 74, 81, 94 and 471 move forwardly in a succeeding cycle of operation following the sub-total cycle of operation the cam edge 199′ contacts subtract bail 49′ in time to depress pawl 199 so that the forward edge of said pawl may pass under the depressed bail 49″ related to the balance key, as illustrated in Fig. 3a showing slide 74 in a partial forward position. Slide 74 thus is permitted to move forwardly a full extent of its movement to set switch 6 (Fig. 3) for a subtractive cycle of operation of the acccumulator, while slides 81, 94 and 471 are stopped by the depressed subtract key bail for controlling devices related to a subtractive operation, as earlier described.

It will be recalled that throughout a sub-total cycle of operation the arm 5 remains in its lowered position so that the accumulator wheels are in engagement with the actuating means throughout the operation and that in a subtract cycle of operation arm 5 is rocked upwardly to disengage the accumulator wheels during the return stroke. In subtractive operations, therefore, arm 5 is adapted to engage lug 205 and restore lever 192 back beyond toggle center so that spring 204 will complete the return movement, and projection 194 releases subtract bail 49′, whereupon said bail is restored by its spring out of cooperation with shoulder 199′ of pawl 199. Thus as the machine continues to operate the forward end of pawl 199 is now again in position to engage the balance key bail 49″ along with slides 81, 94 and 471 for a sub-total non-add operation, as earlier described. During the above operations lever 174 (Fig. 17) holds slide 44 latched in forward position so that the balance key and its related bail 49″ will remain locked in depressed position, until subsequently restored by the overdraft control means as said means automatically terminates the scheduling operation in the manner to be described. The machine continues in alternate sub-total and subtract operations until the amounts of payments subtracted from the accumulator wheels exceeds the value oirginally stored into the register, whereupon a complemental value appears in the register wheels and during a subsequent sub-total operation an overdraft signal will cause operation of the negative sub-total devices in the manner as previously described.

It is desirable at the completion of a reducing balance scheduling operation that the machine be left in condition to set up a new account without first having to clear the keyboard or the register devices.

The present invention includes means whereby an operation of the negative sub-total devices is utilized to control means for automatically terminating a reducing balance scheduling operation and for modifying the control of machine operations at such times so that the register, month wheel and keyboard settings are all at normal cleared condition at the completion of the operation ready for a new account.

It will be recalled that a normal positive sub-total operation requires a totaling and single non-add cycle of operation, while a true negative sub-total operation normally involves two totaling operations and four subtractive cycles of machine operations to print a true negative total and to restore the complement of the true total back into the accumulator wheels.

Operation of the overdraft control devices in a reducing balance scheduling operation is utilized to disable the pawl 199 so that following the non-add cycle which is associated with the first totalizing action related to the overdraft operation, the machine thereafter will cycle in subtractive operations only. At such times, therefore, the negative sub-total operation would include two totalizing operations, a non-add operation and three subtract cycles of operations. Thus a negative total, appearing as a complemental value upon the accumulator wheels, will remain in the register at the end of the first operation (non-add) and is thereafter subtracted out of the register during the second cycle of operation, leaving the register wheels standing at zeros, the third operation then involves a zero totalizing action with a subtractive cycle of operation (to index the overdraft control cam shaft 417) during which zeros would subtract from zeros and in the fourth cycle of operation zeros again subtract from zeros, during which shaft 417 is again indexed back to its normal starting condition, and the accumulator remains cleared at the completion of the operation ready for the next account.

Following a subtractive cycle in which the register wheels are finally reduced to a complemental value, the machine performs a sub-total operation as before. During this operation the pawl 199 is carried forwardly by slide 74 and will pass above a projection 280 of lever 174, so that pawl 199 engages the depressed bail 49″ of the balance key to limit slide 74 for a non-add operation control, while slide 81 trips the totalizing devices. A complemental value appearing in the accumulator wheels, however, now releases lever 418 (Fig. 11) to trip the overdraft control devices which release latch 454 (Fig. 11) from lever 448 permitting said lever to rock lever 450 in a counterclockwise direction (Figs. 11 and 17), as previously described.

Fast to lever 450 is a pin 450' which extends above a lower arm of the lever 174, said arm being formed to provide a cam surface 174'. In the normal position of lever 174, cam surface 174' is positioned downwardly out of the path of movement of pin 450'. In the earlier described counterclockwise movement of lever 174 incident to depression of the balance key, however, cam surface 174' is moved upwardly into engagement with pin 450'. Upon counterclockwise movement of lever 450, by operation of the overdraft control devices in a negative sub-total operation during balance scheduling, pin 450' will engage cam surface 174' and impart a clockwise movement to lever 174 to disengage lug 176 from projection 177 of starting slide 44. It will be noted, however, that at this time slide 44 will be held in forward position by engagement of projection 453 with lug 452 of lever 450, so that the machine continues in operation to complete the negative sub-total operations.

As earlier set forth, in order that the register be clear at the end of the operation, three succeeding subtractive cycles of operation will follow the first non-add cycle of operation in a balance scheduling negative sub-total operation. The following means, therefore, are provided to automatically modify the control settings from a non-add to a subtractive cycle control of machine operation.

A rearward arm of lever 174 is provided with a lug 280 adapted, when lever 174 is in its normal clockwise condition, to be positioned upwardly out of cooperation with the cam surface 281' of a downwardly extending arm 281 formed on the pawl 199. Upon counterclockwise movement of lever 174 incident to depression of the balance key, lug 280 is moved downward sufficiently so that arm 281 of pawl 199 in the first forward movement of slide 74 in the overdraft operation will pass above the lug 280 and pawl 199 will engage the balance key bail 49" to limit slide 74 for a non-add control cycle of operation. In the clockwise operation of lever 174 by the pin 450' lug 280 first engages the under edge of arm 281 but upon return movement of the slide 74, pawl 199 carried thereon will then raise sufficiently so that cam surface 281' then engages the rearward edge of lug 280, as pawl 199 is again carried forwardly, and causes said pawl to be rocked clockwise in sufficient time for the forward edge of the pawl to pass under the bail 49" of the balance key. Slide 74 thus in the second cycle of operation is permitted to move forwardly a full extent of its movement to set the register control means for a subtractive operation. During the subtractive operation the complemental value stored in the segments 435, during the non-add operation, is subtracted from the complemental value which remained in the accumulator wheels. In the above operation slide 94 (Fig. 5) is stopped by the balance key bail 49" to control lateral displacement of the index blades 615 (Fig. 2) out of cooperation with the depressed digit keys 215 and slide 81 (Figs. 4 and 8) is held rearwardly by engagement of projection 465 with lug 464 to prevent a tripping of the zeroizing devices, in the manner as previously described. Since the control slides 81, 94 and 471 must be free for movement in accordance with an overdraft control, the earlier described adjustment of subtract key bail 49' by lever 192 (Fig. 16) is rendered ineffective following the first or non-add cycle of an overdraft operation in the following manner.

The rearward end of the lever 186 (Fig. 16) is provided with a projection 186' adapted for cooperation with the cam 463' on the overdraft control cam shaft 417. During the return stroke of the first or non-add negative sub-total cycle of operation above set forth shaft 417 is indexed 90° in the manner previously described and cam 463 engages projection 186' imparting a further clockwise movement to the lever 186. It is recalled that following a sub-total cycle of operation the lever 192, having been rocked by symbol type arm 196, rests upon shoulder 190 of arm 188 of the lever 186. During the further movement of lever 186, above described, cam edge 282 of arm 188 engages offset 191 rocking lever 192 clockwise beyond center of toggle spring 204 and said spring then completes the restoral of lever 192 and lug 194 of said lever releases the subtract bail 49' to its normal raised position, out of cooperation with slides 81, 94 and 471. Also pawl 199 is again depressed by lug 280 and passes beneath bail 49" to permit slide 74 to move to its subtractive control position while slides 81, 94 and 471 are stopped by bail 49" to all operate in the regular manner for a sub-total overdraft control previously described.

Indexing of shaft 417 during the return stroke of the second and third cycles of operation eventually rotates cam 463' sufficiently to release lever 186 for restoral by its spring 187, and shoulder 190 is again positioned beneath offset 191 of lever 192. Lever 192, however, remains held rocked in clockwise position by toggle spring 204 and subtract bail 49', therefore, remains in normal raised position, free of the control slides 74, 81, 94 and 471.

In the third and fourth cycles of operation as cam shaft 417 is indexed the various control cams function for negative sub-total operations, in the manner as heretofore described. At the start of the third cycle, however, the accumulator is now at zero position and a tripping of the zeroizing means with its subsequent cycle of operation at this time is for the purpose of merely indexing the cam shaft 417, as is also the fourth cycle of operation wherein zeros are subtracted from zeros. It will be noted that the printing devices are released in the usual manner by the negative total devices during the fourth cycle of operation. However, in the present instance, the accumulator wheels being at zero value position all of the type bars 611 (Fig. 2) remain in their lower positions and lugs 154 will prevent any of the latches 152 from holding the hammers 146 in active spring charged position, and no printing action of the hammers is therefore effected.

During the final overdraft cycle of operation cam 458' (Figs. 4 and 11) through lever 448 restores lever 450 (Fig. 17) clockwise removing pin 450' from surface 174' of lever 174 and lug 452 from projection 453 of slide 44. Slide 44 is then restored, along with control slides 74, 81, 94 and 471, to normal position and releases the balance key 368 with its bail 49" and also the digit keys, as earlier described. Release of bail 49" and subsequent rocking thereof through spring 50 rocks lever 174 clockwise to normal position while restoral of the balance key will permit reengagement of roller 43 (Fig. 4) with slide 44 to prevent said slide from again tripping the cyclic clutch means 103—104, and the operation is thus terminated.

There are frequently times when an operator may wish to stop an automatic operation without waiting for the machine to run a complete scheduling operation, or may wish to interrupt the operation and substitute manual control and thereafter complete the automatic operation.

To stop or to interrupt an operation the lever 170 (Fig. 17) is merely pushed rearwardly, whereupon projection 173 of said lever rocks lever 174 clockwise to disengage the lug 176 from projection 177 of slide 44. Slide 44 is thereafter returned rearwardly, as previously described, until stopped by engagement of shoulder 178 with lug 172 of lever 170, said lug having been moved downwardly to cooperate with shoulder 178 by the rearward movement of lever 170. Engagement of shoulder 178 with lug 172 limits the rearward movement of slide 44 to release the balance key only, and the keyboard setting will therefore remain as set. If an operation is to be terminated at this point the operator may then clear the keyboard setting by operation of the clear key 309 in well known manner, and the register may be cleared by a total key operation, the value thereon being either printed or not in accordance with well known print, non-print means.

If, on the other hand, the operator should wish to vary the scheduling operation, the machine may now be operated manually by the keys 274 and 368 (Fig. 16), during which operation slide 44 returns sufficiently each time to clear the operating key without releasing the keyboard setting, and if key 170 is then returned to its forward position and balance key 368 depressed the automatic scheduling operation will again continue until automatically terminated by the overdraft devices as above set forth.

*Automatic accumulating balance scheduling*

For an accumulative balance scheduling operation lever 170 is set to its forward or clear position and lever 182 is manually adjusted clockwise (Fig. 16) to its rearward position, permitting lever 186 to rock forwardly and displace shoulder 190 from the path of movement of offset projection 191 of lever 192.

Upon depression of balance key 368, the machine will now start in accumulative balance scheduling operations, and it will be understood that except as hereinafter described the parts function in like manner to that as set forth for a reducing balance scheduling operation.

In accumulative balance scheduling the machine must make alternate sub-total (non-add) and plus cycles of operation in lieu of the alternate sub-total and subtract cycles required for reducing balance scheduling.

It will be recalled that during a balance key sub-total operation the arm 196 of the character symbol type bar moves forwardly and engages lug 195 to impart a counterclockwise movement to the lever 192, and that said lever is stopped by engagement of offset projection 191 with the arm 188 of lever 186 to set the bail 49' related to the subtract key 274 in partially operated position to effect displacement of pawl 199 for a subtractive control movement of control slide 74.

In accumulative balance scheduling operations the setting of lever 182 having displaced arm 188 from beneath offset 191, the lever 192 now is permitted to rock for a greater extent of movement and to thereby fully depress the subtract key bail 49'.

The pawl 199 fast to control slide 74 is provided with a shoulder 285 (Fig. 3a) adapted in the fully depressed position of subtract bail 49' to engage said bail and prevent any forward movement of slide 74 so that control switch 6 will remain in its counterclockwise or add control position shown in Fig. 3.

For accumulative balance scheduling operations, therefore, the machine will operate in automatic alternate sub-total and plus cycles of operation, and may be terminated or interrupted and restarted at will by operation of lever 170 as in the manner set forth for reducing balance schedule operations.

Having now disclosed in the above specification together with the accompanying drawings, a means whereby a listing calculator adapted for performing manual accumulative and reducing balance scheduling operations may accomplish said operations automatically while retaining full use of the manual control operations, what I claim is:

1. In a machine of the class described, the combination of an accumulator having a series of accumulator wheels, a month printing control wheel, actuator racks and related differential stop bars adapted to enter amounts additively or subtractively into the accumulator wheels and to adjust the month printing control wheel forwardly or reversely, totalizing means, printing means, cyclic operating means, accumulator control means for engaging said accumulator wheels and said month wheel with said actuator racks, a control slide for releasing the cycle operating means, a plurality of machine function control slides operable by the cyclic operating means including a slide for tripping the totalizing means, and a slide adapted to control said accumulator control means to determine a character of operation, a plurality of operating keys adapted to release the cyclic operating control slide, stops settable by said keys to limit movement of the function control slides and thereby control the character of a machine cycle of operation, restoring means for the slides; repeat cycle means settable under control of one of said operating keys to prevent a restoral of the cyclic operating control slide and thereby provide for a series of automatic machine cycles of operation, means automatically operable during one cycle of operation to cause a modified control operation by the function control slides in a succeeding cycle of operation to thereby change the character of said succeeding cycle of operation, and means operable during said succeeding cycle of operation for automatically restoring said modifying means whereby the characters of operation are caused to alternate during said series of automatic machine cycles of operation.

2. The invention according to claim 1 wherein the function control slides cooperate with the stop settable by the said selected operating key for effecting a sub-total operation including control by the accumulator control slide for effecting engagement of said wheels with the actuator racks for a non-add operation, and means automatically operable by the cyclic operating means during said non-add operation to adjust other of said stops and thereby modify control operation of said slides in a succeeding cycle of operation, whereby the accumulator control means effects engagement of said wheels with the actuator racks in such manner as to cause a different character of operation to be performed upon said wheels during said succeeding cycle of operation.

3. The invention according to claim 2 wherein the said means automatically operable during a cycle of operation for modifying operation of the function control slides modifies operation of the accumulator control slide to control engagement of said wheels for a subtractive character of operation.

4. The invention according to claim 3 wherein the means automatically operable during a cycle of operation for modifying operation of the function control slides may also modify operation of the accumulator control slide to control engagement of said wheels for an additive character of operation.

5. The invention according to claim 4 having a pawl pivoted to the said accumulator control slide and wherein said pawl is adapted for adjustment to a plurality of positions of cooperation with said stops including cooperation with the active stops relating to said selected operating key for the purpose of limiting movement of the accumulator control slide to set the accumulator control means for a non-add operation of said wheels, means operable under control of the cyclic operating devices during said operation to automatically adjust other stops and wherein one of said stops cooperates with said pawl to control an operation of the accumulator control slide in a succeeding cycle of operation to set the accumulator control means for other characters of operation to be effected in said succeeding cycle of operation.

6. The invention according to claim 5 wherein the means operable by the cyclic operating devices for modifying an operation control will automatically adjust one of said stops to a plurality of selective control positions, said stop being adapted in one of said positions to cooperate with said pawl for controlling movement of the accumulator control slide to provide for an operation of said wheels in a given direction during said succeeding cycle of operation while in another adjusted position said stop cooperates with said pawl to govern movement of the control slide to set the accumulator control means for an operation of said wheels in the opposite direction in said succeeding cycle of operation.

7. The invention according to claim 6 wherein said pawl is carried by the accumulator control slide and is provided with a cam surface adapted in one position of the adjusted stop to cooperate therewith and displace said pawl out of cooperation with the active stop set by said selected operating key to permit control movement by said slide whereby a subtractive operation will be performed upon said accumulator wheels during said succeeding cycle of operation.

8. The invention according to claim 7 wherein said pawl is provided with a shoulder cooperable with said stop in another adjusted position to prevent a movement of the accumulator control slide and thereby cause an additive operation to be performed upon said wheels during said succeeding cycle of operation.

9. The invention according to claim 8 and including means whereby in either of said operations performed upon the wheels said stops will be adjusted by the modifying means to a third position to control movement of the accumulator control slide in a further succeeding cycle of operation to set the accumulator control means for a non-add operation of said accumulator wheels.

10. The invention according to claim 4 including means adjustable to a plurality of positions and adapted to control an operation of the automatically operable means for modifying operation of the control slides and thereby selectively determine the character of operation of said modified control.

11. The invention according to claim 10 including a manually settable lever for positioning said adjustable means to either of two positions to selectively predetermine a plus or a minus control by the means automatically operable for modifying operation of the control slides.

12. The invention according to claim 11 characterized in that the means automatically operable for modifying operation of the function control slides is adjustable through means operable by the cyclic operating means and in accordance with a control by said selected operating key, and wherein said modifying means is thereafter automatically restored by the modified control operation of the accumulator control means during a succeeding cycle of operation.

13. The invention according to claim 12 including means yieldably operable by the cyclic operating means for cooperation with the stops settable by the operating keys and wherein one of said stops in active set position will permit sufficient movement of said yieldably operable means to set the modifying means for the function control slides while any other of said stops in active set position will act to prevent a setting of said modifying means.

14. The invention according to claim 13 including symbol printing type yieldably operable to selective printing position by the cyclic operating means in accordance with the settable stops and wherein operation of said symbol printing type to a selected position in accordance with said selected operating key is utilized to set the modifying means of the function control slides to vary a character of a succeeding machine cycle of operation.

15. The invention according to claim 14 including a member operable by the cyclic operating means during said modified control operations to restore the modifying means and wherein said member is ineffectve in restoring the modifying means during an operation of the cyclic operating means incident to said selected operating key.

16. The invention according to claim 15 wherein the accumulator control means includes a member adapted for restoring the modifying means, wherein said member is ineffective during an operation of the cyclic operating means incident to said selected operating key in restoring the modifying means and wherein said member will be active in the modified succeeding cycle of operation to restore the modifying means.

17. The invention according to claim 9 and having overdraft control devices for converting a complemental value appearing on the accumulator wheels to a true negative total value; means operable by the overdraft control devices to restore the repeat cycle means settable by the operating key thereby causing the automatic series of operations to be automatically terminated.

18. The invention according to claim 17 wherein the means operable under control of the true negative total devices to set means for terminating machine operations when a value in the accumulator wheels has been reduced to a complemental value includes means operable by the overdraft devices for restoring repeat cycle means settable by the operating key and to concurrently set means for preventing a return movement of the cyclic operating slide until subsequently released by the overdraft devices in concluding a plurality of machine cycles of operation.

19. The invention according to claim 18 including true negative sub-total devices for restoring the complement of a true negative total back into the accumulator wheels wherein an operation of the overdraft control devices during a series of automatic reducing balance scheduling operations related to operation of the said selected operating key acts to release the repeat cycle means and to also concurrently set means for delaying the return movement of the cyclic operating slide whereby said slide remains in active control position to provide four additional cycles of operation incident to a true negative sub-total control following which said slide is released through means operable by the sub-total overdraft devices to thereby conclude all operations.

20. The invention in accordance with claim 19 wherein the stop related to said operating key acts to control movement of the accumulator control slide for a non-add control of the accumulator control means during the first of said true negative sub-total cycles of operation and means operable by the overdraft control devices to adjust the pawl pivoted to the accumulator control slide to control operation of said accumulator control slide for a subtractive character of operation during the second cycle of overdraft control operation and means operable by the overdraft devices during said subtractive cycle of operation to disable the operations control modifying means whereby the third cycle of overdraft control will operate the accumulator control slide for a second subtractive control character of operation and wherein said disabling means is also effective for a third subtractive character of operation during the fourth cycle of overdraft control whereby at the completion of said operations the complement of the true negative total will have been subtracted from the accumulator wheels leaving said wheels cleared to zero reading position at the conclusion of the described series of operation.

21. The invention according to claim 20 including keyboard clearout devices operable by the cyclic operating control slide and characterized in that operation of the clearout devices is prevented by setting of the repeat cycle means for said series of machine cycles of operation and that thereafter a restoration of the repeat cycle means by the overdraft control devices will permit of a subsequent operation of said clearout devices under control of the overdraft devices to thereby conclude the operation with the keyboard in automatically cleared condition.

22. The invention according to claim 21 and including a manually operable means to disengage the repeat cycle means from the cyclic operating control slide and thereby interrupt the series of operation at any time.

23. The invention according to claim 22 wherein the manually operable means includes a lever adapted for disengaging the repeat cycle means from the cyclic operating slide and wherein said lever is also provided with a projection adapted during operation of said lever to be concurrently positioned for limiting return movement of said slide and thereby disable the keyboard clearout devices, whereby the automatic series of operation may be interrupted without clearing the keyboard setting.

HARVIE J. DUKE.

No references cited.